(12) United States Patent
Grant et al.

(10) Patent No.: US 9,092,436 B2
(45) Date of Patent: Jul. 28, 2015

(54) PROGRAMMING INTERFACE FOR USE BY MEDIA BUNDLES TO PROVIDE MEDIA PRESENTATIONS

(75) Inventors: Scott Grant, San Francisco, CA (US); Jeff Miller, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 916 days.

(21) Appl. No.: 12/555,539

(22) Filed: Sep. 8, 2009

(65) Prior Publication Data
US 2011/0060991 A1 Mar. 10, 2011

(51) Int. Cl.
*H04N 5/445* (2011.01)
*G06F 3/00* (2006.01)
*G06F 15/16* (2006.01)
*G06F 17/30* (2006.01)
*H04N 21/431* (2011.01)
*H04N 21/482* (2011.01)
*H04N 21/81* (2011.01)
*G06F 9/445* (2006.01)

(52) U.S. Cl.
CPC ........ *G06F 17/30056* (2013.01); *H04N 21/431* (2013.01); *H04N 21/482* (2013.01); *H04N 21/8166* (2013.01); *G06F 9/445* (2013.01)

(58) Field of Classification Search
CPC H04N 21/8166; H04N 21/482; H04N 21/431
USPC ............... 725/38, 40, 51, 109, 134, 142, 115; 715/716, 854, 810; 709/219
See application file for complete search history.

(56) References Cited

U.S. PATENT DOCUMENTS

| | | | |
|---|---|---|---|
| 6,452,609 B1 | 9/2002 | Katinsky et al. | |
| 6,556,546 B1 * | 4/2003 | Maeda et al. | 370/282 |
| 6,772,438 B1 * | 8/2004 | Blackketter et al. | 725/136 |
| 7,844,498 B2 | 11/2010 | Robbin et al. | |
| 7,899,714 B2 | 3/2011 | Robbin et al. | |
| 8,122,466 B2 * | 2/2012 | Rothschild | 725/32 |
| 8,271,676 B1 * | 9/2012 | Sathiananthan | 709/231 |
| 8,583,758 B2 * | 11/2013 | Casey et al. | 709/217 |

(Continued)

FOREIGN PATENT DOCUMENTS

WO   2004/052012 A1   6/2004

OTHER PUBLICATIONS

Blu-ray Disc, Application Definition Blu-ray Disc Format, Mar. 2005, pp. 1-45 http://www.blu-raydisc.com/Assets/Downloadablefile/bdj_gem_application_definition-15496.pdf.*

(Continued)

*Primary Examiner* — Pinkal R Chokshi
(74) *Attorney, Agent, or Firm* — Novak Druce Connolly Bove + Quigg LLP

(57) ABSTRACT

A programming interface for a media management application is described herein. The programming interface allows a media bundle to induce a media presentation at the media management application. More particularly, a media bundle can be provided at a client device, and the media bundle can include program instructions that at least in part use the programming interface to cause the media presentation to be provided at the client device. The media presentation can make use of digital media assets that are stored at a media library on the client device, that are stored within the media bundle, or that are remotely accessible to the client device. The media presentation can provide a multimedia experience for the user of the client device.

25 Claims, 12 Drawing Sheets

(56) References Cited

U.S. PATENT DOCUMENTS

| | | |
|---|---|---|
| 2002/0023114 A1 | 2/2002 | Ito |
| 2002/0091848 A1 | 7/2002 | Agresta et al. |
| 2002/0104019 A1 | 8/2002 | Chatani et al. |
| 2002/0129089 A1 | 9/2002 | Hegde et al. |
| 2002/0138439 A1 | 9/2002 | Matsushima et al. |
| 2002/0138593 A1 | 9/2002 | Novak et al. |
| 2003/0002863 A1* | 1/2003 | Shinohara ............... 386/125 |
| 2003/0079042 A1 | 4/2003 | Yamanaka et al. |
| 2003/0084460 A1 | 5/2003 | Chung et al. |
| 2003/0101092 A1 | 5/2003 | Fuller et al. |
| 2004/0148424 A1 | 7/2004 | Berkon et al. |
| 2004/0266336 A1* | 12/2004 | Patsiokas et al. ........ 455/3.04 |
| 2004/0268451 A1 | 12/2004 | Robbin et al. |
| 2005/0021478 A1 | 1/2005 | Gautier et al. |
| 2005/0050345 A1 | 3/2005 | Dowdy et al. |
| 2005/0102191 A1 | 5/2005 | Heller |
| 2005/0111663 A1 | 5/2005 | Lotspiech et al. |
| 2005/0165843 A1 | 7/2005 | Capps et al. |
| 2005/0203959 A1 | 9/2005 | Muller et al. |
| 2005/0256770 A1 | 11/2005 | Popkin et al. |
| 2006/0074810 A1 | 4/2006 | Verberkt et al. |
| 2006/0080557 A1* | 4/2006 | Kim et al. ............... 713/193 |
| 2006/0089949 A1 | 4/2006 | Robbin et al. |
| 2006/0095339 A1 | 5/2006 | Hayashi et al. |
| 2006/0117344 A1* | 6/2006 | Lamkin et al. ............ 725/38 |
| 2006/0123052 A1 | 6/2006 | Robbin et al. |
| 2006/0177198 A1* | 8/2006 | Jarman et al. ............ 386/95 |
| 2006/0285820 A1* | 12/2006 | Kelly et al. ............... 386/83 |
| 2007/0083911 A1* | 4/2007 | Madden et al. .......... 725/135 |
| 2007/0180468 A1 | 8/2007 | Gill et al. |
| 2008/0063369 A1* | 3/2008 | Kim et al. ................ 386/95 |
| 2008/0222314 A1* | 9/2008 | Matsushita et al. ........ 710/13 |
| 2008/0235662 A1 | 9/2008 | Chen et al. |
| 2009/0055526 A1 | 2/2009 | Mikami et al. |
| 2009/0240787 A1* | 9/2009 | Denny .................... 709/219 |
| 2010/0005084 A1* | 1/2010 | Nguyen et al. ............. 707/5 |
| 2010/0313215 A1* | 12/2010 | McCoskey et al. ......... 725/31 |
| 2011/0008014 A1* | 1/2011 | Hashimoto et al. ....... 386/244 |
| 2011/0060741 A1 | 3/2011 | Heller et al. |
| 2011/0060742 A1 | 3/2011 | Heller et al. |
| 2011/0162010 A1* | 6/2011 | Ellis et al. ................ 725/40 |

OTHER PUBLICATIONS

"Application Definition Blue-ray Disc Format BD-J Baseline Application and Logical Model Definition for BD-ROM", Mar. 1, 2005, pp. 7-43.

International Search Report and Written Opinion for PCT Application No. PCT/US2010/047901, mailed Dec. 12, 2010.

"EverAd Enables Windows Media Player Users to Download PlayJ-Based Free and Authorized Music," PR Newswire, New York, Jun. 8, 2000, p. 1.

* cited by examiner

PROGRAMMING INTERFACE FOR USE BY MEDIA BUNDLES TO PROVIDE MEDIA PRESENTATIONS

CROSS-REFERENCE TO OTHER APPLICATIONS

This application references: (i) U.S. patent application Ser. No. 12/555,643, filed concurrently herewith, and entitled "DISTRIBUTION AND USAGE OF MEDIA BUNDLES", which is herein incorporated by reference; and (ii) U.S. patent application Ser. No. 12/555,750, filed concurrently herewith, and entitled "DIGITAL MEDIA BUNDLES FOR MEDIA PRESENTATION PLAYBACK", which is herein incorporated by reference.

BACKGROUND OF THE INVENTION

1. Field of the Invention

The present invention relates to media bundles and, more particularly, to media bundles that enable media presentation playback.

2. Description of the Related Art

Digital Versatile Discs (DVDs) are a popular means to distribute of video media content, such as movies. DVDs can be purchased or rented either from physical stores or online stores. It is common for DVD to contain not only the electronic file containing to video media content (e.g., for a movie) but also an introductory interactive media portion that provides introductory multimedia effects as well as a menu. The menu enables a user of a playback device, such as a DVD player or a personal computer, to make a menu selection. The menu can, for example, enable the user of the playback device to: start movie playback at a selected scene or chapter, play director's commentary, play deleted scenes, etc.

Conventionally, content providers have been able to submit digital media assets under their control to an online media distribution site for further distribution. In recent years, advanced online media distribution sites, such as iTunes™ media store, have permitted online submission of digital media assets, such as songs, movies, television shows and application programs, to the online media distribution site.

However, when videos (e.g., movies) are electronically submitted to an online distribution site, there is no ability to provide support for introductory interactive media (e.g., menu) functionality as is available with DVDs. As a result, when a downloaded video is played, playback of the video is activated without introductory interactive media. Consequently, electronically delivered videos cannot offer the same playback experience as is available with DVDs.

Thus, there is a need for enhanced video distribution that permits electronically delivered videos to provide interactive media functionality.

SUMMARY

A programming interface for a media management application is described herein. The programming interface allows a media bundle to induce a media presentation at the media management application. More particularly, a media bundle can be provided at a client device, and the media bundle can include program instructions that at least in part use the programming interface to cause the media presentation to be provided at the client device. The media presentation can make use of digital media assets that are stored at a media library on the client device, that are stored within the media bundle, or that are remotely accessible to the client device. The media presentation can provide a multimedia experience for the user of the client device.

The client device can, for example, be a computing device. Examples of a computing device include a personal computer (e.g., desktop computer, notebook computer, netbook computer, etc.), or a portable handheld electronic device (e.g., Portable Digital Assistant (PDA), portable media player, multi-function mobile telephone, etc.).

The invention can be implemented in numerous ways, including as a method, system, device, apparatus (including computer readable medium and graphical user interface). Several embodiments of the invention are discussed below.

In one embodiment, a computing system can include at least a processor for operating at least a media management program, and a data storage device for storing at least a media library and at least one digital media bundle. The digital media bundle can include a plurality of bundle components, at least one of the bundle components including bundle program code. The media library can be used by the media management program. The computing system can also include a programming interface configured to facilitate assess to programming methods and programming objects associated with the media management application. The processor can be configured to execute the bundle program code and in doing so can produce a media presentation at the computing system. The media presentation being produced can include at least media content retrieved from the media library stored in the data storage device through use of the programming interface.

In another embodiment, a method for providing a media presentation at a computing device can, for example, include at least identifying a media bundle to be presented, the media bundle including media bundle program code, and performing the media bundle program code to (i) access a media library at the computing device to retrieve media content, and (ii) provide a media presentation at the computing device using at least the retrieved media content.

In still another embodiment, a computer readable medium can include at least executable computer program code stored thereon for providing a media presentation at a computing device. The computer readable medium can, for example, include computer program code for identifying a media bundle to be presented, the media bundle including media bundle program code, and computer program code for performing the media bundle program code to (i) access a media library to retrieve media content, and (ii) provide a media presentation at the computing device using at least the retrieved media content.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like elements, and in which.

DETAILED DESCRIPTION OF EMBODIMENTS OF THE INVENTION

A programming interface for a media management application is described herein. The programming interface allows a media bundle to induce a media presentation at the media management application. More particularly, a media bundle can be provided at a client device, and the media bundle can include program instructions that at least in part use the programming interface to cause the media presentation to be provided at the client device. The media presentation can make use of digital media assets that are stored at a media library on the client device, that are stored within the media bundle, or that are remotely accessible to the client device. The media presentation can provide a multimedia experience for the user of the client device.

The client device can, for example, be a computing device. Examples of a computing device include a personal computer (e.g., desktop computer, notebook computer or netbook computer), or a portable handheld electronic device (e.g., Portable Digital Assistant (PDA), multi-function mobile telephone).

Several embodiments of the invention are discussed below with reference to FIGS. 1-8. However, those skilled in the art will readily appreciate that the detailed description given herein with respect to these figures is for explanatory purposes as the invention can extend beyond these limited embodiments.

Figure 1:
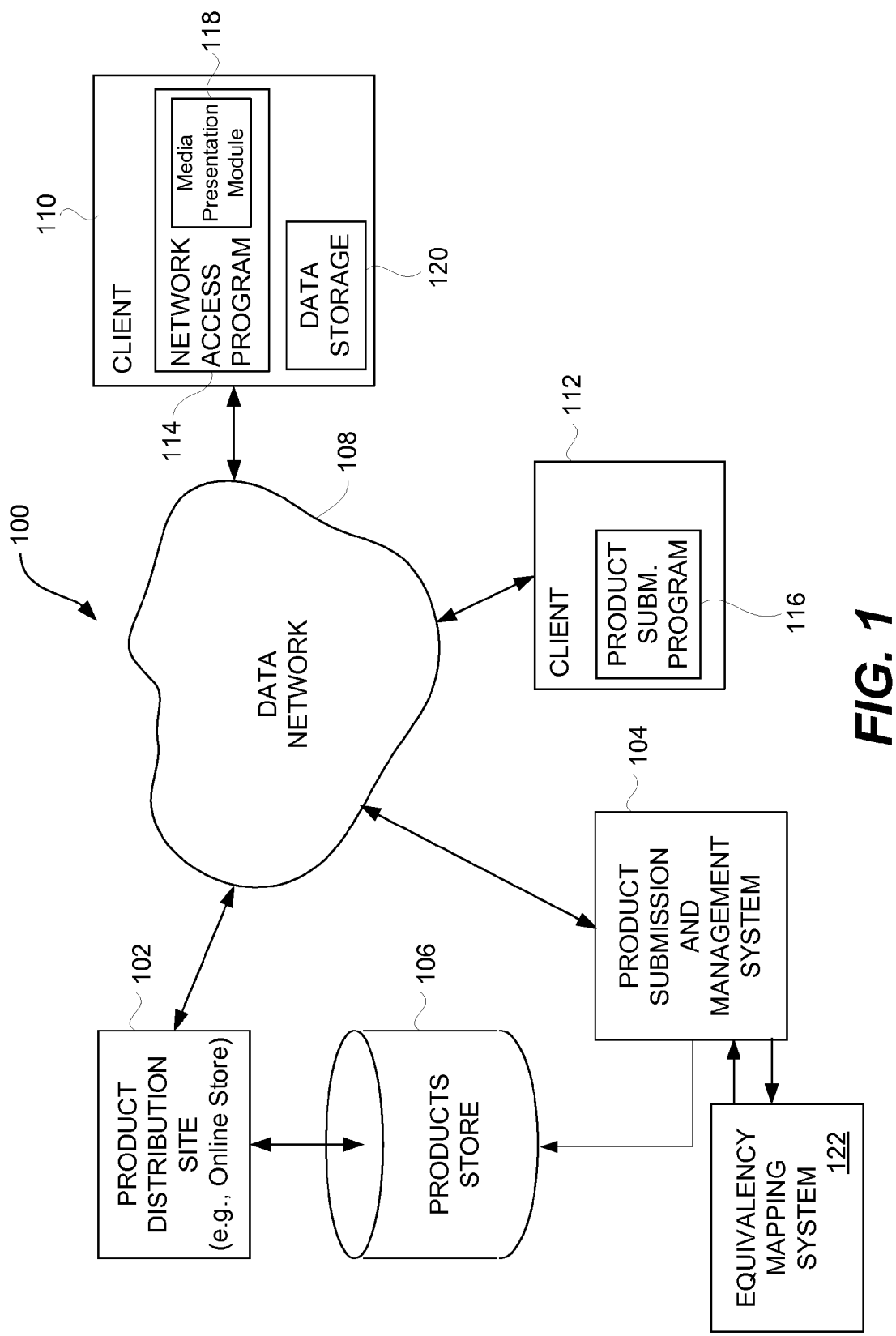
FIG. 1 is a block diagram of a product submission and distribution system according to one embodiment.

FIG. 1 is a block diagram of a product submission and distribution system 100 according to one embodiment. The product submission and distribution system 100 can include a product distribution site 102. The product distribution site 102 can provide an online access point for distribution of various digital products. For example, the product distribution site 102 can be referred to as an online store. A product submission and management system 104 can operate to receive submissions of digital products from various digital product submitters. The product submission and management system 104 can process submission of digital products and authorize distribution of approved digital products. The digital products can be stored in a products store 106. In one embodiment, the products store 106 includes a mass data store and one or more databases. The products store 106 can provide mass storage of the numerous digital products that are available for distribution (e.g., purchase or rental). For example, digital products that have been purchased can be accessed from the products store 106 over a data network 108 by way of the product distribution site 102. Examples of digital products include media items or computer program products. Media items can pertain to music (e.g., songs or albums) or video (e.g., movies or television shows). Computer program products can pertain to applications (or application programs), animations, or presentations.

The product submission and distribution system 100 can also include a first client 110 and a second client 112. Typically, the product submission and distribution system 100 can also include a plurality of different clients 110, 112. The first client 110 can include a network access program 114. The second client 112 can include a product submission program 116. Some clients can also include both the network access program 114 and the product submission program 116.

The network access program 114 can be an application program (e.g., software application) that operates on the first client 110, which is a computing device. One example of a suitable network access program is a network browser (e.g., Microsoft Explorer or Safari). Another example of a suitable network access program is iTunes™ offered by Apple Inc. The first client 110 can be coupled to the product distribution site 102 through the data network 108. Hence, the first client 110 can interact with the product distribution site 102 to review, purchase, execute, play and/or manage digital products.

The network access program 114 can include a media presentation module 118. The media presentation module 118 can operate to provide a media presentation at the first client 110. The first client 110 can have a media bundle that governs the media presentation. A media bundle can be considered a digital product. A media bundle can also be considered part of or a supplement to another digital product, such as a digital media asset. A media bundle includes bundle components which can include digital media assets as well as computer program code. The computer program code can serve to define and/or control the presentation. The presentation can, for example, present one or more digital media assets at the first client 110. The media presentation module 118 can execute or interpret the computer program code within the media bundle to provide the presentation at the first client 110. For example, in one embodiment, the computer program code within the media bundle is a script language, such as Javascript. The first client 110 can also provide a data storage 120 that provides local storage for various digital products. The stored digital products (e.g., digital media assets, media bundles, etc.) can be considered a media library (e.g., local media library).

The product submission program 116 can be an application program (e.g., software application) that operates on the second client 112, which is a computing device. The product submission program 116 can be used to submit digital products to the product submission and management system 104 for eventual distribution by the media distribution site 102. Although the network access program 114 and the product submission program 116 are shown in FIG. 1 as separate programs, it should be understood that such programs can be integrated into a single program or reside on the same client machine.

The media distribution system 100 can also include an equivalency mapping system 122. The equivalency mapping system 122 can interact with the product submission and management system 104 to identify digital media assets that are equivalent to one another. By using computer-implemented techniques to determine which digital media assets are equivalent to one another, digital media assets within media bundles can make use of "equivalent" digital media assets if the exact digital media asset specified by the media bundle is unavailable at the first client 110. The "equivalent" digital media assets are backup or alternative digital media assets that can be used in place of a specified digital media asset that is not available.

In the product submission and distribution system 100 shown in FIG. 1, the digital products can be submitted to the product submission and management system 104 by way of the product submission program 116. The digital products that have been submitted (e.g., via the second client 112) can be processed and then stored in the products store 106. Thereafter, the stored digital products can be available to be purchased from the product distribution site 102. Upon purchasing a particular digital product, the product distribution site 102 can permit the digital data for the particular digital product to be retrieved from the products store 106 and then delivered (e.g., downloaded) from the product distribution site 102 to the requesting client 110 through the data network 108. In this regard, the product distribution site 102 or some other delivery server (not shown) can obtain the digital data corresponding to the particular digital product from the products store 106 and downloads such digital data through the data network 108 to the client 110. The downloaded digital data can then be stored on the client 110. In one embodiment, the downloaded digital data is encrypted as received at the client 110 but is decrypted and then perhaps re-encrypted before persistently stored on the client 110. Thereafter, the client 110 can utilize (e.g., execute) the digital data of the digital product at the client 110.

The product submission and distribution system 100 may allows a user of the client 110 to utilize the network access program 114 to browse, search or sort through a plurality of digital products that can be purchased from the product distribution site 102. The network access program 114 may also allow the user to preview or demo some or all of a digital product. In the event that the user of the network access program 114 desires to purchase a particular digital product, the user (via the network access program 114) and the product distribution site 102 can engage in an online commerce transaction in which the user pays for access rights to the particular digital product.

The submission and purchase of the digital products can be achieved over the data network 108. In other words, the submission and purchase of the digital products can be achieved online. The purchase of media items online can also be referred to as electronic commerce (e-commerce). In one embodiment, the data network 108 includes at least a portion of the Internet. The clients 110, 112 can vary with application but generally are computing devices that have memory storage. Often, the clients 110, 112 are personal computers or other computing devices that are capable of storing and presenting media to their users. In one embodiment, the connections through the data network 108 between the product distribution site 102 and the clients 110, 112 can be through secure connections, such as Secure Sockets Layer (SSL).

Although the product distribution site 102, the product submission and management system 104, the products store 106 and the equivalency mapping system 122 are shown in FIG. 1 as being separate components, it should be understood that any of these components can be combined into one or more apparatus. For example, the product submission and management system 104 can be incorporated into the product distribution site 102. As another example, the products store 106 can be incorporated into the product distribution site 102 or the product submission and management system 104.

Figure 2:
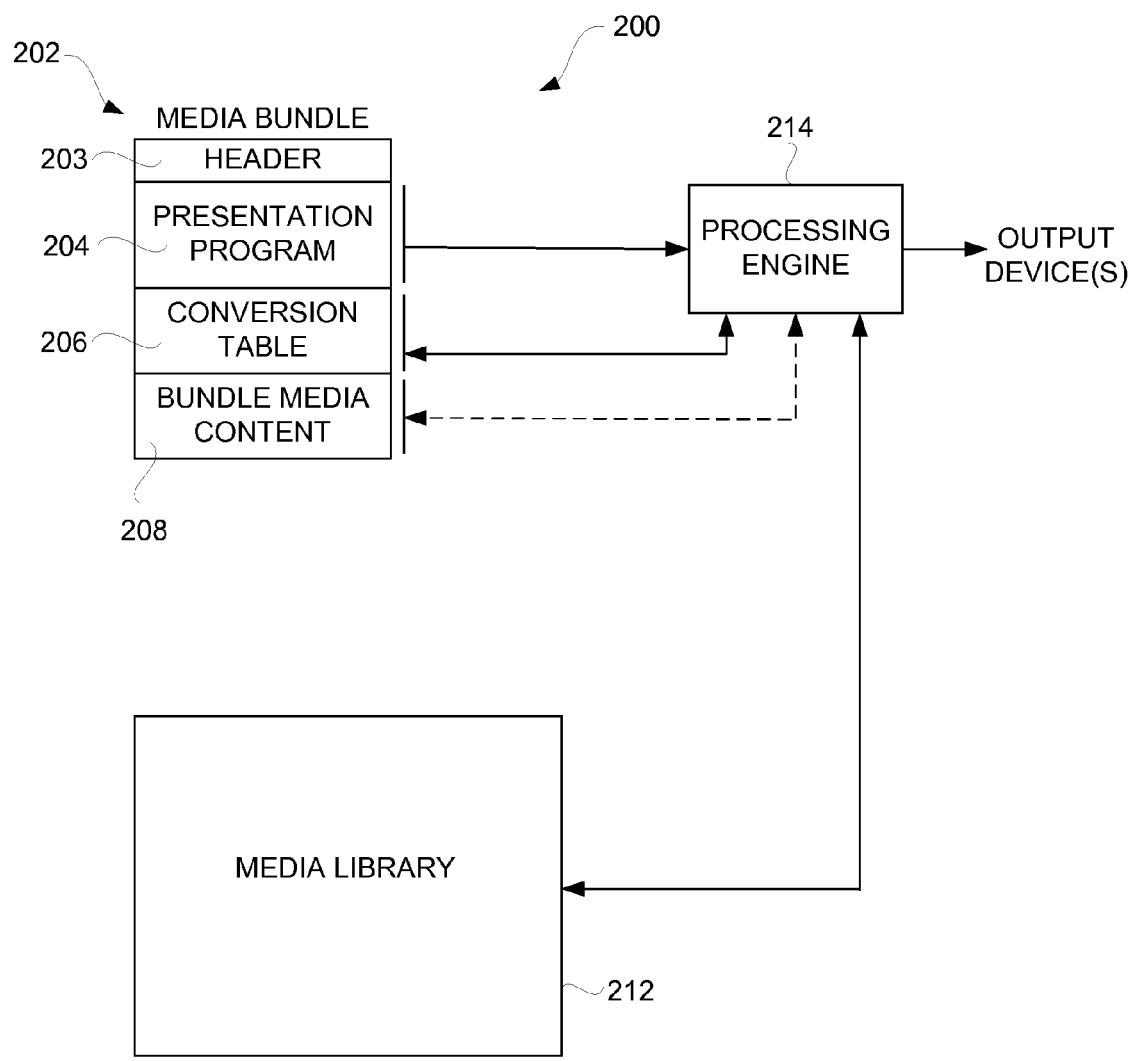
FIG. 2 is a block diagram of a media presentation system according to one embodiment.

FIG. 2 is a block diagram of a media presentation system 200 according to one embodiment. The media presentation system 200 includes a media bundle 202. The media bundle 202 is a container for a plurality of bundle components. In the embodiment of the media bundle 202 illustrated in FIG. 2, the bundle components for the media bundle 202 include: a header 203, a presentation program 204, a conversion table 206, and bundle media content 208. The media presentation system 200 also includes a media library 212 that stores various digital media assets. In particular, in one embodiment, the media bundle 202 is associated with at least one particular digital asset stored in the media library 212. As one example, the media bundle 202 can be associated with at least one digital media asset corresponding to a movie, an album of songs, or a television show. The header 203, for example, can include data that associates the media bundle 202 to the at least one particular digital media asset.

The media presentation system 200 also includes a processing engine 214. The processing engine 214 can, in one embodiment, operate to perform the presentation program 204 with respect to the media bundle 202 so as to produce output data for one or more output devices. The output devices are, for example, a display and/or speaker. The processing engine 214 can execute or interpret the presentation program 204 of the media bundle 202. In executing or interpreting the presentation program 204, the processing engine 214 will be directed to access and present one or more of the digital media assets. These digital media assets can be in the bundle media content 208 and/or in the media library 212. Since the digital media assets in the media library 212 may come from a media distribution system before, with or after receiving the media bundle 202, these digital media assets in the media library 212 are primarily identified using distributor identifiers.

In some cases, these digital media assets may be identified in the presentation program 204 by the use of a producer identifier (or vendor identifier). The processing engine 214 can utilize and interact with the conversion table 206 provided in the media bundle 202 to convert the provider identifiers to distributor identifiers that are understood by the media distribution system. Since the media distribution system provides the digital media assets associated with the media bundle 202 to the media library 212, the processing engine 214 needs to associate provider identifiers to the distributor identifiers so that the appropriate digital media assets may be located and utilized by the presentation program 204 to produce the desired output for the one or more output devices.

Figure 3A:
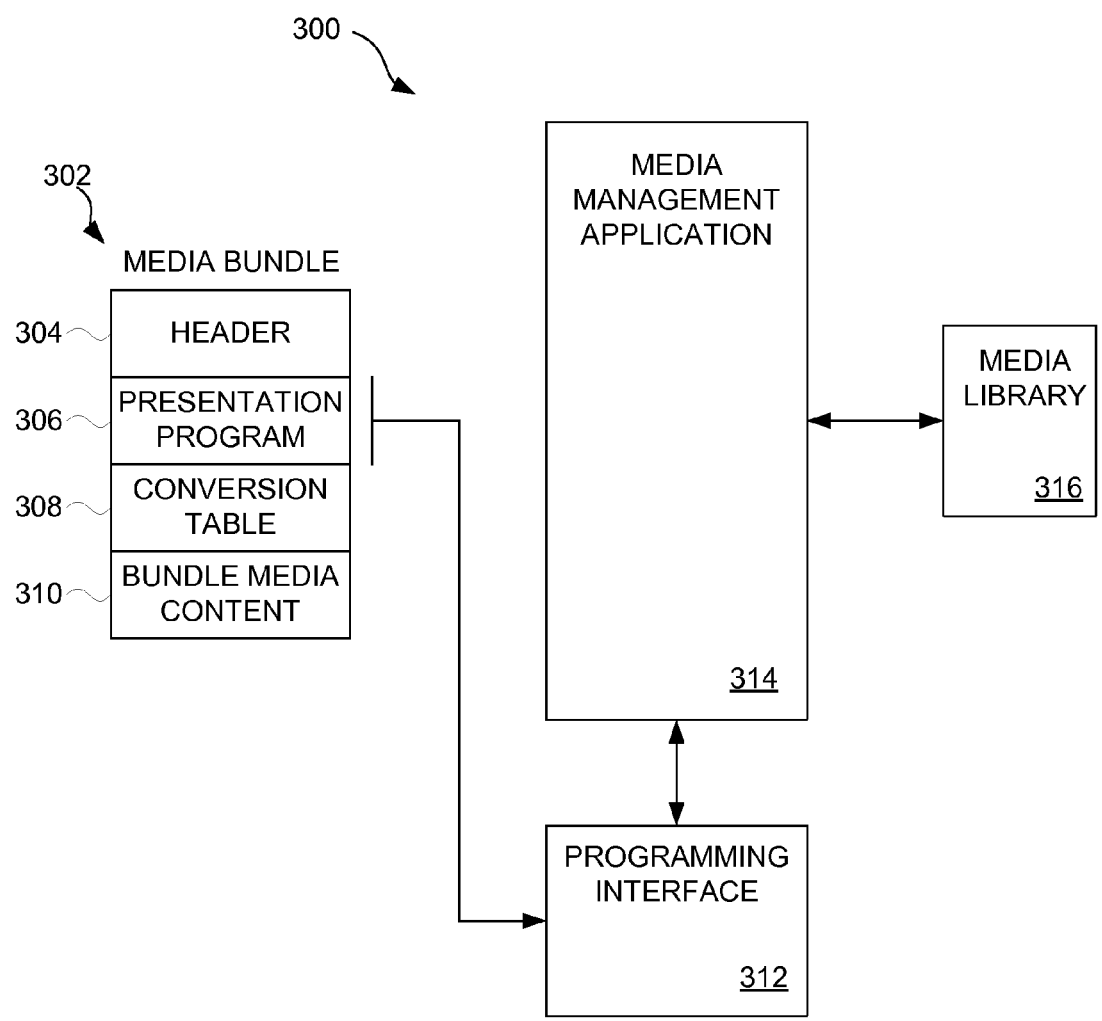
FIG. 3A is a block diagram of a media presentation system according to one embodiment.

FIG. 3A is a block diagram of a media presentation system 300 according to one embodiment. The media presentation system 300 includes a media bundle 302. The media bundle 302 is a container for a plurality of bundle components. In one embodiment, the media bundle 302 is similar to the media bundle 202 illustrated in FIG. 2. The bundle components for the media bundle 302 can include: a header 304, a presentation program 306, a conversion table 308, and bundle media content 310. The media presentation system 300 can also includes a programming interface 312 and a media management application 314. The programming interface 312 provides a programmatic interface to interact with the media management application 314. The programming interface 312 is, for example, an Application Program Interface (API). The media management application 314 can access a media library 316 to display, play, organize, search, browse, rent, or purchase digital media assets. The programming interface 312 can be read-only so that the media library 316 can not be altered via the programming interface 312.

The media library 316 can store various digital media assets. In one embodiment, the media bundle 302 is associated with at least one particular digital asset stored in the media library 316. As one example, the media bundle 302 can be associated with at least one digital media asset corresponding to a movie, an album of songs, or a television show. The header 304, for example, can include data that associates the media bundle 302 to the at least one particular digital media asset.

The presentation program 306, when operated, can utilize the programming interface 312 to interface with the media management application 314. The presentation program 306 can thus cause digital media assets to be retrieved from the media library 316 and then presented (e.g., listed, played, etc.), thereby providing a media presentation. In addition, the presentation program 306 can access and use digital media assets (e.g., bundle media content 208) resident within the media bundle 302. Still further, the presentation program 306 can also access and use digital media assets located in remote media depositories (e.g., remote data storage device) via a network (LAN, WAN, or global network). Regardless of where the digital media assets reside, the presentation program 306 can find, list, or play tracks or playlists. The presentation program 306 can also form a playlist, referred to as temporary playlist, which is for purposes of the media presentation and is maintained separate from the media library 316.

An example of a presentation program (or bundle program code) is as follows:

```
<html>
<head>
</head>
<body>
<script type="text/javascript" charset="utf-8">
    var playlist = null;
    function createTempPlaylist( )
    {
        if( !playlist )
        {
            var displaydiv = document.getElementById(
'display' );
            playlist = iTunes.createTempPlaylist( );
            var ids = [
            "XID295",
            "XID264",
            "XID265",
            "XID266",
            "XID267",
            "XID268",
            "XID269",
            "XID270",
            "XID271",
            "XID272",
            "XID273",
            "XID274",
            "XID275",
            "XID292",
            "XID285",
            "XID420",
            "XID437",
            "XID436",
            "XID439",
            "XID497",
            "XID421",
            "XID498" ];
            var tracksToAdd = new Array( );
            var arrayIndex = 0;
            for( var i = 0; i < ids.length; i ++ )
            {
                var foundTracks = iTunes.findTracksByXID(
ids[ i ] );
                if( ( foundTracks ) && (
foundTracks.length > 0 ) )
                {
                    var track = foundTracks[ 0 ];
                    tracksToAdd[ arrayIndex ] = track;
                    displaydiv.innerHTML += "<a href='#'
onclick='return playTrackOneWithPlaylistPlay(" + arrayIndex +
")'>play: " + track.name + "</a><br/>";
                    arrayIndex++;
                }
            }
            playlist.addTracks( tracksToAdd );
        }
        return false;
    }
    function playTrackOneWithPlaylistPlay( i )
    {
        if( playlist )
            playlist.play( i );
```

```
        return false;
    }
</script>
<a href="#" onclick="return createTempPlaylist( );">create the
playlist</a>
<div id="display" />
</body>
</html>
```

The above example of a presentation program uses JavaScript programming code and a programming interface (e.g., API) to a media management application that supports a media library storing digital media assets. The example operates to create a temporary playlist containing a plurality of tracks identified by vendor identifiers (e.g., XIDs), and then puts links in a displayed window so that the user can click on any of the links to play the various constituent track for the playlist. It assumes that the media library (e.g., user's library) contains the tracks associated with the specific XIDs.

Figure 3B:
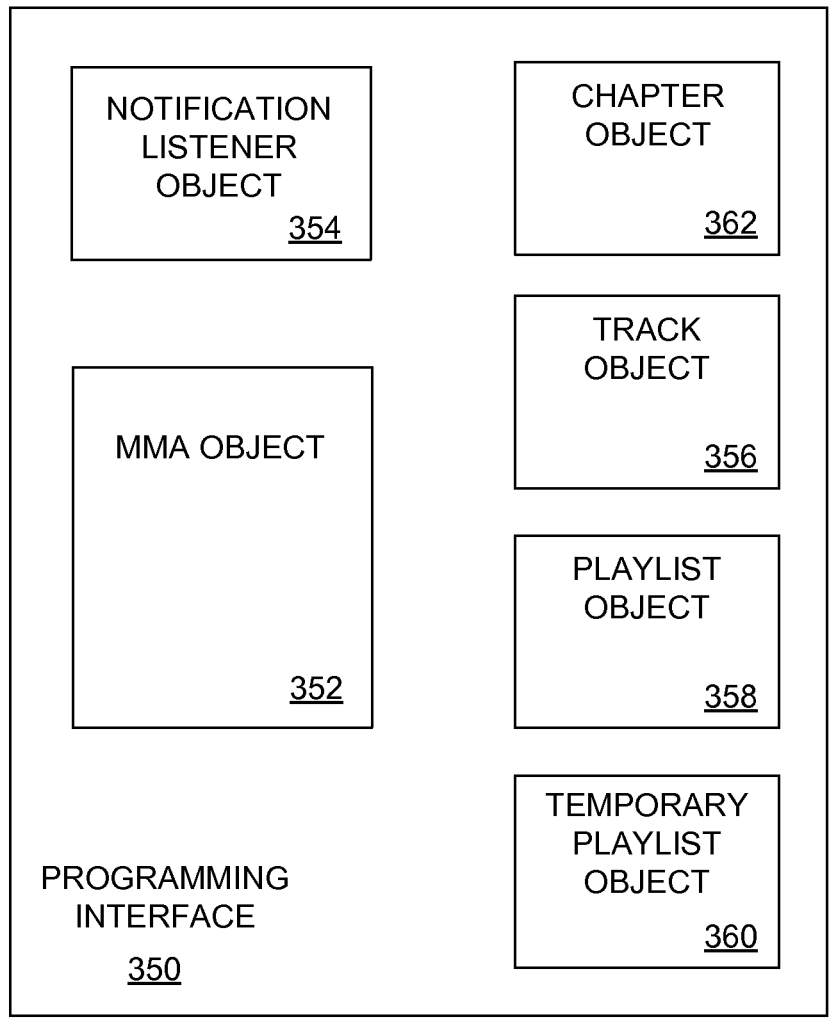
FIG. 3B is a block diagram of a programming interface according to one embodiment.

FIG. 3B is a block diagram of a programming interface 350 according to one embodiment. The programming interface 350 provides a programmatic interface to a media management application (MMA) such that an external computer program code (e.g., presentation program or a bundle program code) can communicate with the MMA to receive information from or control operations of the MMA. In one embodiment, the programming interface 350 can be provided as a JavaScript API. In other embodiment, the programming interface 350 can be provided in other programming languages. The programming interface 350 can, for example, corresponding to the programming interface 312 illustrated in FIG. 3A.

The programming interface 350 includes a MMA object 352. The MMA object 352 is the primary object for the programming interface 350. The MMA object 352 includes properties and methods so that external programs can access information concerning the MMA. The MMA object 352 can, for example, be implemented for iTunes™ as be known as an iTunes object. The programming interface 350 can also include a notification listener object 354 that is alerted when events occur in the MMA. The MMA provides notifications about such events that have occurred. The notification listener object 354 can receive these notifications and provide them to the presentation program. For example, the notification listener object 354 can be notified when the MMA starts playing a media item. The presentation program can receive these notifications by adding an event listener object to the MMA window object. For example:

```
window.addEventListener( "play", function( ) {
    document.write( "cool" ) }, false );
```

Thereafter, the event listener object will, for example, get notified when the MMA begins playing content or adds the text to the document contents.

Notification Object

The notification object 354 can receive various notifications as, for example, identified in the following table. In this example, it should be noted that a media bundle is referred to as a booklet. The following table describes a plurality of notification methods:

| Name | Description |
| --- | --- |
| bookletclosing | Sent when the booklet will be closed. Booklets can use this event to save anything they need to save using the HTML5 web storage APIs described here: http://dev.w3.org/html5/webstorage/ |
| bookletopened | Sent when the booklet is opened. Booklets can use this time to read any stored data and prepare for use. |
| ended | Sent when a track finishes playing. The event object received includes a "track" field that is the persistent ID for the track that just ended. |
| error | Sent when there is an error playing content. |
| hidden | Sent when the booklet view is hidden from view. This can occur if the user plays a movie in the iTunes window while the booklet is open. |
| pause | Sent when the currently playing track is paused. Use the iTunes.currentPlayingTrack property to determine which track paused. |
| play | Sent when playback of a track is ready to begin. Use the iTunes.currentPlayingTrack property to determine which track paused. |
| playing | Sent when playback of a track actually starts. Use the iTunes.currentPlayingTrack property to determine which track is playing. |
| playingtrackchanged | Sent when iTunes transitions from playing one track to another track. |
| playlistremoved | Sent when a playlist is removed from the iTunes database, most likely because the user deleted the track. |
| quitting | Sent when iTunes is about to quit running. |
| shown | Sent when the booklet view is shown. This can occur if the user ends playback of a movie in the iTunes window while the booklet is open. |
| timeupdate | Sent every third of a second during playback. |
| videoclosed | Sent when a video playback window is closed. |
| volumechange | Sent when the playback volume for iTunes content changes. |

The programming interface 350 can also include additional objects that can be secondary objects to the MMA object 352. In particular, the additional objects of the programming interface 350 can include a track object 356, a playlist object 358, a temporary playlist object 360, and a chapter object 362. The track object 356 provides properties and methods concerning tracks. The playlist object 358 provides properties and methods concerning playlists. The temporary playlist object 360 provides properties and methods concerning temporary playlists. The chapter object 358 provides properties and methods concerning chapters within media items (e.g., tracks, movies, etc.). The properties for these additional objects are not prefetched but are accessed by callbacks.

MMA Object (e.q., iTunes Object)

The MMA Object can have various properties such as identified in the following table.

| Name | Value | Description |
| --- | --- | --- |
| acceptedLanguages | string | This is the standard accept languages HTTP header. This can be used by the content to prepare itself for the correct language the user expects. |
| currentChapter | number | The current chapter index offset of the currently playing media. If the currently playing media does not have chapters, returns zero. |
| currentPlayerState | number | The current state of playback. One of the following values: iTunes.PlayingState iTunes.StoppedState iTunes.FastForwardingState iTunes.RewindingState Default is iTunes.StoppedState. |
| currentPlayingTrack | Track object | If playing, returns the currently playing Track object. Returns null if not currently playing. |
| currentTime | number | The time offset in seconds from the beginning of the media that is currently playing (paused, fast forwarding, etc.). Returns zero if iTunes is not playing anything. |
| isCoverFlowAvailable | Boolean | True if the platform supports coverflow views and false otherwise. |
| isInFullscreen | Boolean | True if iTunes is in fullscreen mode, false otherwise. |
| isInMiniPlayerMode | Boolean | True if iTunes is in mini player mode, false otherwise. |
| isMuted | Boolean | True if the sound is muted, false otherwise. |
| isSourceListOpen | Boolean | True if the source list is open, false otherwise. For booklets, this is always false. |
| Platform | string | String description of the platform, for example on OSX the value is: Mac |
| quickTimeVersion | string | String version number for the installed QuickTime player. |
| screenReaderRunning | Boolean | True if there is an accessibility screen reader running, false otherwise. |
| Version | string | String identifying the version of iTunes, for example iTunes 8.2 is: 8.2 |
| Volume | number | A number between 0.0 and 1.0 representing the current volume level. |

The MMA Object can have various methods such as identified in the following table.

| Method | Description |
| --- | --- |
| Back_track ( ) | Starts playback at beginning of current track or if already there at beginning of the previous track. |
| Close_booklet ( ) | Closes booklet and presents previous display (e,g., track listing). |
| Create_Temp_Playlist ( ) | Creates a temporary playlist into which tracks can be added, allows a custom list of items for playback and allows gapless playback. |
| Fast_forward ( ) | Skips ahead in the track being played. |
| Find_Playlist_ByName (name) | Returns one or more playlist objects that match the name. |
| Find_Playlist_ByPersistentID (id) | Returns one or more playlist objects that match the persistent ID. |
| Find_Tracks_ByGeniusID (id) | Return one or more track object that match the Genius ID. |
| Find_Tracks_ByPersistentID (id) | Return one or more track object that match the persistent ID. |
| Find_Tracks_ByStoreID (id) | Return one or more track objects that match the store ID. |
| Find_Tracks_ByTextFields (params) | Returns one or more track objects that match the specified parameters (i.e., text fields). |
| Find_Tracks_ByXID (id) | Returns one or more track objects that match the specified XID (i.e., vendor identifier). |
| Go_To_Library ( ) | Takes to library playlist and closes media bundle presentation. |

-continued

| Method | Description |
|---|---|
| Next_Chapter ( ) | Advances playback to a next chapter. |
| Next_Track | Advances playback to beginning of next track. |
| Pause ( ) | pauses playback |
| Play (url, params) | Starts playback of media content not in the local media library. The url provides specifies the media content to be played. The parameter specify optional fields for controlling playback. |
| Previous_Chapter ( ) | Moves playback to a previous chapter. |
| Previous_Track ( ) | Moves playback to a previous track. |
| Resume ( ) | Resumes playback if previously paused and halts forwarding or rewind of those operations are ongoing. |
| Rewind ( ) | Skips backwards in the currently playing track to resume playback of the track. |
| Set_Mute (should_be_muted) | Mutes or unmutes sound output of MMA dependent on parameter (should_be_muted). |
| Set_Volume (volume) | sets playback volume dependent on parameter (volume) ranging from 1.0 to 1.0 |
| Stop ( ) | Stops playback. |

The parameters for the Play (url, params) method can include one or more parameters such as identified in the following table. It should be noted that the iTunes LCD referenced therein can be more generally referred to as a MMA screen.

| Name | Value | Description |
|---|---|---|
| album | string | The string album for the content to be displayed at in the iTunes LCD during playback. |
| Artist | string | The string artist for the content to be displayed at in the iTunes LCD during playback. |
| lastChapterIndex | number | The one based index of a chapter at which to play through and then end playback. Ignored if the index is out of bounds. |
| startChapterIndex | number | The one based index of a chapter at which to start playback. If the index is out of bounds, playback is started at the first chapter. |
| startTimeOffest | number | The time offset in seconds from the beginning of the content at which to start playback. If the offset if out of bounds, playback is started at the beginning of the content. |
| stopTimeOffset | number | The time offset in seconds from the beginning of the content to play through and then end playback. If the offset if out of bounds, playback is ended at the end of the content. |
| Title | string | The string title for the content to be displayed at in the iTunes LCD during playback. |

Track Object

The Track Object can have various properties such as identified in the following table.

| Name | Value | Description |
|---|---|---|
| album | string | String name of the track album, ie: "Thriller". |
| albumArtist | string | The album artist field for the track. |
| albumRating | number | The user or computed rating of the album that this track belongs to (0 to 100). If the album rating has never been set, or has been set to 0, it will be computed based on the ratings of tracks in the album. |
| albumRatingKind | number | The album rating kind. If the album rating has never been set, or has been set to 0, the kind is Track.RatingKindComputed. Otherwise, the kind is Track.RatingKindUser. |
| artist | string | String name of the track artist, ie: "Michael Jackson". |
| artworkURL | string | String URL that can be used to display the artwork image for a track in HTML content. |
| bitRate | number | The bit rate of the track in kbps. |
| Bookmark | number | The bookmark time of the track in seconds. Will be zero if there is no bookmark. |
| bookmarkAsString | string | The bookmark time of the track as a string in the format MM:SS. |
| bpm | number | The tempo of the track in beats per minute. |
| category | string | The category field for the track. |
| chapters | array | An array of Chapter objects. The array is null if there are no chapters available. |
| comment | string | The freeform notes of the track. |
| compilation | Boolean | True if the track is part of a compilation, false otherwise. |
| composer | string | String name of the composer. |
| dateAdded | Date | Date object indicating when the track was added to the library. |
| discount | number | The number of discs in the source album. |
| discNumber | number | The index of the disc containing the track in the source album. |
| Duration | number | Length of the track in seconds. |
| durationAsString | string | Length of the track in the string form MM:SS. |
| episodeID | string | The episode ID for the track. |
| episodeNumber | number | The episode number for the track. |
| eqPreset | string | The string name of the tracks equalizer preset. |
| excludedFrom-Shuffle | boolean | True if the track is skipped during shuffle playback, false otherwise. |
| geniusID | string | The genius identifier for the track. |
| genre | string | The string name of the genre for the track. |
| grouping | string | The grouping (piece) of the track. |
| isEnabled | boolean | True if the track is checked for playback, false otherwise. |
| isPartOfGaplessAlbum | boolean | True if the track is part of a gapless album, false otherwise. |
| isUnplayed | boolean | True if the track has never been played, false otherwise. |
| isValid | boolean | True if this track object instance is valid, false otherwise. For example, if the track has been removed from the library by the user, isValid would be false. |
| lastPlayedDate | date | Date object indicating when the track was last played. |
| longDescription | string | The longer of the two free form description fields. |
| lyrics | string | String containing the lyrics. |
| modificationDate | date | Date object indicating when the track was last modified. |
| name | string | Name of the track, for example "Beat It" |
| persistentID | string | String representing the iTunes library persistent ID of the track. |
| playedCount | number | The number of times the track has been played. |

-continued

| Name | Value | Description |
|---|---|---|
| rating | number | The rating of the track (0 to 100). If the track rating has never been set, or has been set to 0, it will be computed based on the album rating. |
| ratingKind | number | The track rating kind. If the album rating has never been set, or has been set to 0, the kind is Track.RatingKindComputed. Otherwise, the kind is Track.RatingKindUser. |
| releaseDate | date | A Date object set to the release date of the track. |
| rememberBookmark | boolean | True if the track will remember its playback location across instances of iTunes. False otherwise. |
| sampleRate | number | The sample rate of the track in Hz. |
| seasonNumber | number | The season number for the track. |
| shortDescription | string | The shorter of the two free form description fields. |
| show | string | The show name field for the track. |
| sizeInBytes | number | The size of the track in bytes. |
| skippedCount | number | The number of times the track has been skipped. |
| skippedDate | date | A Date object set to the last date and time that the track was skipped. |
| sortAlbum | string | String name of the album used for sorting. If a sort album is specified, iTunes will use this string instead of the real album name when sorting. |
| sortAlbumArtist | string | String name of the album artist used for sorting. If a sort album artist is specified, iTunes will use this string instead of the real album artist when sorting. |
| sortArtist | string | String name of the artist used for sorting. If a sort artist is specified, iTunes will use this string instead of the real artist when sorting. |
| sortComposer | string | String composer used for sorting. If a sort composer is specified, iTunes will use this string instead of the real composer when sorting. |
| sortName | string | String name of the track used for sorting. If a sort name is specified, iTunes will use this string instead of the real track name when sorting. |
| sortShow | string | String show name used for sorting. If a sort show is specified, iTunes will use this string instead of the real show name when sorting. |
| startTimeOffest | number | The start time offset from the beginning of the track in seconds. |
| stopTimeOffset | number | The stop time offset from the beginning of the track in seconds. |
| storeID | string | iTunes music store ID of the track. If the track was not purchased via the iTunes music store, this value will be 0. |
| trackCount | number | The total number of tracks across all discs in the source album. |
| trackNumber | number | The index of the track in the source album. |
| videoKind | number | The kind of video that this track is one of the following values: Track.VideoKindNone Track.VideoKindMovie Track.VideoKindMusicVideo Track.VideoKindTVShow |
| volumeAdjustment | number | The relative volume adjustment of the track in the range −100 to 100 indicating the percent of adjustment. |
| xid | string | The ID assigned to the track by the track's vendor. |
| year | string | The year of the track's recording or release. |

The Track Object can have various methods such as identified in the following table.

| Method | Description |
|---|---|
| Play (options) | Starts playback of track. Returns Boolean true if playback of track was started and false otherwise. |
| Reveal ( ) | Returns Boolean true if track was revealed and false otherwise. Failure could be result of the track having been deleted, check the isValid property to ensure the playlist object is valid. |

The parameters for the Play (options) method can include one or more parameters such as identified in the following table.

| Name | Value | Description |
|---|---|---|
| lastChapterIndex | number | The one based index of a chapter at which to play through and then end playback. Ignored if the index is out of bounds. |
| playFromNewPlaylist | Boolean | True if the track should be played from its own playlist. False otherwise. When played from its own playlist, the track plays and stops. When played from its existing playlist, iTunes will continue playing the next item in the playlist when done with this item. |
| startChapterIndex | number | The one based index of a chapter at which to start playback. If the index is out of bounds, playback is started at the first chapter. |
| startTimeOffest | number | The time offset in seconds from the beginning of the content at which to start playback. If the offet is out of bounds, playback is started at the beginning of the content. |
| stopTimeOffset | number | The time offset in seconds from the beginning of the content to play through and then end playback. If the offset is out of bounds, playback is ended at the end of the content. |

Playlist Object

The Playlist Object can have various properties such as identified in the following table.

| Name | Value | Description |
|---|---|---|
| Duration | number | Total length of all tracks in the playlist in seconds. |
| durationAsString | string | Total length of all tracks in the playlist in the string form MM:SS. |
| isSetToShuffle | Boolean | True if the playlist is set to shuffle, false otherwise. |
| isShared | Boolean | True if the playlist is set being shared, false otherwise. |
| isSmart | Boolean | True if the playlist is set a smart playlist, false otherwise. |
| isValid | Boolean | True is this Playlist object instance is valid, false otherwise. For example, if the playlist has been deleted by the user, isValid would be false. |
| isVisible | Boolean | True if the playlist is visible in the source list, false otherwise. |
| Name | string | String name of the playlist. |
| Parent | Playlist | A Playlist object if this playlist is in a folder (has a parent), null otherwise. |
| persistentID | string | String representing the iTunes library persistent ID of the playlist. |

-continued

| Name | Value | Description |
|---|---|---|
| repeatMode | number | Indicates the repeat mode of the playlist is one of the following values:<br>Playlist.RepeatModeOff<br>Playlist.RepeatModeOne<br>Playlist.RepeatModeAll |
| sizeInBytes | number | Total size of all the constituent tracks in the playlist in bytes. |
| specialKind | number | Indicates what, if any, special kind of playlist this Playlist object represents. Must be one of the following values:<br>Playlist.SpecialKindNone<br>Playlist.SpecialKindPurchasedMusic<br>Playlist.SpecialKindPartyShuffle<br>Playlist.SpecialKindPodcasts<br>Playlist.SpecialKindFolder<br>Playlist.SpecialKindMusic<br>Playlist.SpecialKindMovies<br>Playlist.SpecialKindTVShows<br>Playlist.SpecialKindAudiobooks |

The Playlist Object can have various methods such as identified in the following table.

| Method | Description |
|---|---|
| Play (start_index) | Starts playback of playlist. Returns Boolean true if playback of playlist was started, otherwise is false. Failure could be result of the playlist having been deleted, check the isValid property to ensure the playlist object is valid. The start_index is an offset number into the playlist to start playback. |
| Reveal ( ) | Returns Boolean true if playlist was revealed and false otherwise. Failure could be result of the track having been deleted, check the isValid property to ensure the playlist object is valid. |

Temporary Playlist Object

The Temporary Playlist Object is an object representing a temporary playlist. The temporary playlist allows for custom ordering of tracks for playback, for ensuring gapless playback, or for playing only a selected set of tracks. The Temporary Playlist Object has all the same properties and methods as the Playlist Object noted above, but the Temporary Playlist Object is not saved to the media library of the MMA. The additional property for a Temporary Playlist Object is provided in the following table.

| Name | Value | Description |
|---|---|---|
| tracks | array | An array of tracks in the temporary playlist or null. |

The Temporary Playlist Object can have various additional methods such as identified in the following table.

| Method | Description |
|---|---|
| Clear ( ) | Removes all tracks from the temporary playlist. |
| addTracks (tracks) | Serves to add tracks to the temporary playlist. One or more track objects can be added to the temporary playlist. |
| addURLs (objects) | One or more objects representing media to add to the temporary playlist. The method adds the one or more objects to the temporary playlist. |
| removeTracks (index) | Serves to remove a track from the temporary playlist. The track object to be removed from the temporary playlist is identified by the index, which is a number. |

The objects (or parameters) for the addURLs method can include the following fields.

| Name | Value | Description |
|---|---|---|
| Album | string | The string album for the content to be displayed in the iTunes LCD during playback. |
| Artist | string | The string artist for the content to be displayed in the iTunes LCD during playback. |
| url | number | [Required] The relative url to the media content to add to the playlist. |
| Title | string | The string title for the content to be displayed in the iTunes LCD during playback. |

Chapter Object

The Chapter Object that includes information about a particular chapter within a given track. In conjunction with the Track.play method, this information can be used to start playback at a specific chapter. The Chapter Object can have various properties such as identified in the following table.

| Name | Value | Description |
|---|---|---|
| artworkURL | string | String URL that can be used to display the artwork image for a track in HTML content. Null if there is no artwork. |
| Name | string | Display name of the chapter. Null if the field is empty. |
| startOffsetTime | number | Time offset from the beginning of the track in seconds of the start of this chapter. Default is zero. |

There are no methods defined for the chapter object. Chapter objects are retrieved from a Track object using the Track.chapters array. As an example, the Chapter objects be obtained by the following program code:

```
if( ( myTrack.chapters ) && ( myTrack.chapters.length > 0 )
)
{
var firstChapter = myTrack.chapters[ 0 ];
alert( firstChapter.name )
}
```

Figure 4A:
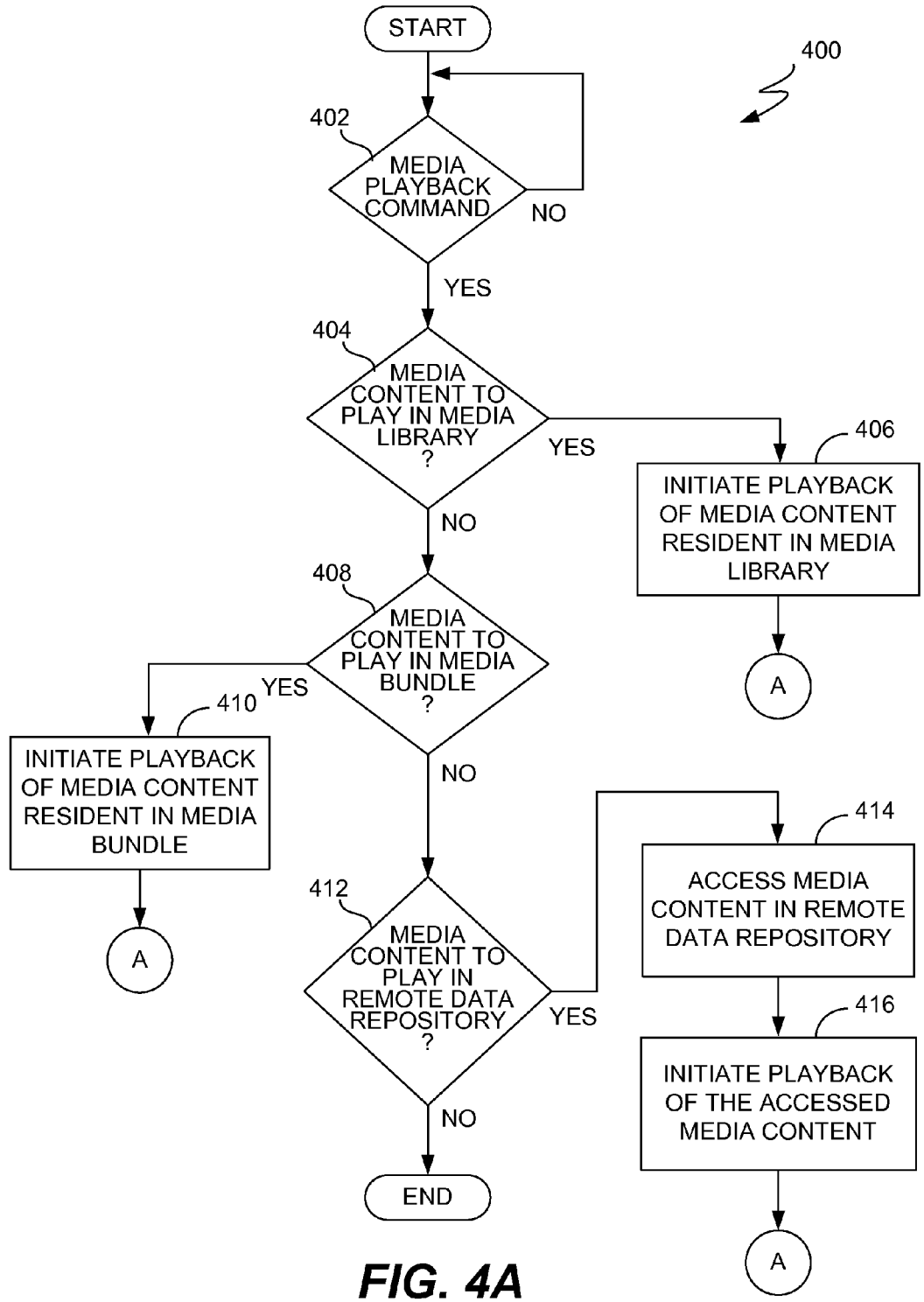
FIGS. 4A and 4B is a flow diagram of a playback process according to one embodiment.
Figure 4B:
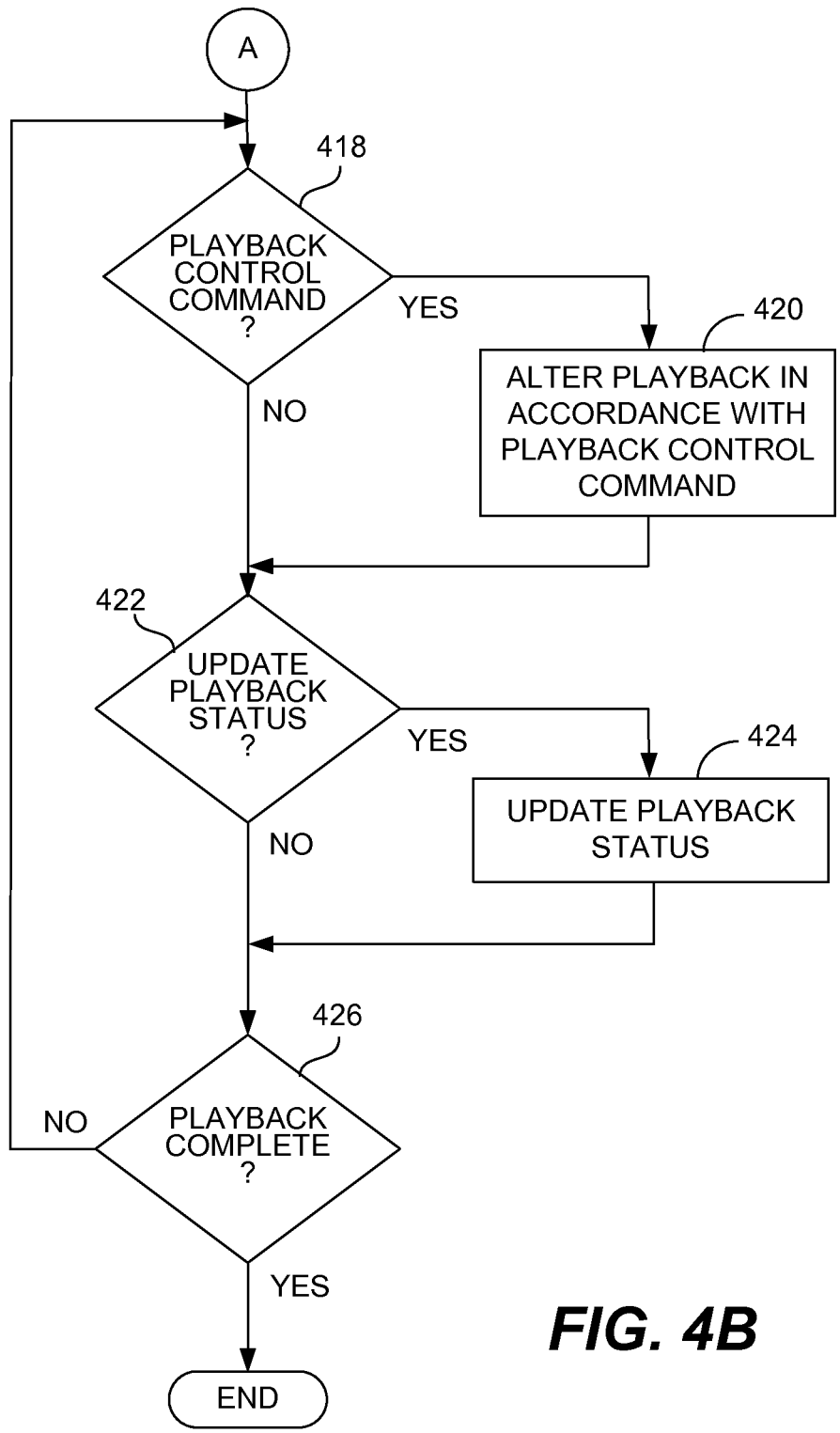

FIGS. 4A and 4B is a flow diagram of a playback process 400 according to one embodiment. The playback process 400 is associated with playing media content on a computing device. The playback process 400 can represent one implementation of a presentation program that with the assistance of a programming interface can provide media playback for a media bundle. The playback process 400 concerns processing that can be performed by a presentation program, such as the presentation program 306 illustrated in FIG. 3A. In one embodiment, the playback process 400 is, for example, processing that can be performed by the presentation program 306 together with the assistance of the programming interface 312.

The playback process 400 can begin with a decision 402 that determines whether a media playback command has been requested. When the decision 402 determines that a media playback command has not been requested, the playback process 400 can await a request for media playback. Once the decision 402 determines that a media playback command has been requested, the playback process 400 can continue. In other words, the playback process 400 can be deemed invoked when media playback, by a media playback command, is requested.

After the decision 402 determines that a media playback command has been requested, a decision 404 can determine whether the media content to be played back is within a media library. When the decision 404 determines that the media content to be played is within a media library, playback of the media content resident in the media library can be initiated 406. On the other hand, when the decision 408 determines that the media content to be played is not within a media library, a decision 408 can determine whether the media content to be played is within a media bundle. Here, the media bundle can contain not only the presentation program for performing the playback process 400 but also certain media content used by the presentation program. When the decision 408 determines that media content to be played is within the media bundle, certain media content resident in a media bundle can be initiated 410.

On the other hand, when the decision 408 determines that media content to be played is not within a media bundle, a decision 412 can determine whether the media content to be played is within a remote data repository. Here, the media content for playback can reside in a remote data repository that can be accessed by the computing device over a network. When the decision 412 determines that the media content to be played is within a remote data repository, the media content can be accessed 414 in the remote data repository. Thereafter, the playback of the accessed media content can be initiated 416. Alternatively, when the decision 412 determines that the media content to be played is not within a remote data repository, the playback processing 400 can end. In the event that the playback process 400 ends, the media content being requested for playback is either unavailable or not properly identified.

Following the blocks 406, 410 and 416, additional processing can be performed while in the playback of the corresponding media content is being performed. In this regard, the playback process 400 can include a decision 418 that determines whether a playback control command has been received. Examples of the playback control command are certain (e.g., play, pause, next chapter, next track, previous chapter, previous chapter, resume, mute, volume, stop) of the methods discussed above regarding a MMA object, a track object, a playlist object or a temporary playlist object. When the decision 418 determines that a playback control command has been received, the playback in process can be altered 420 in accordance with the playback control command. Following the block 420 or following the decision 418 when a playback control command has not been received, a decision 422 can determine whether playback status should be updated. When the decision 422 determines that playback status should be updated, the playback status can be updated 424.

Following the block 424 or following the decision 422 when playback status is not to be updated, a decision 426 can determine whether the playback has completed. When the decision 426 determines that the media content being played has completed its playback, the playback process 400 can end. On the other hand, when the decision 426 determines that playback of the media content has not completed, the playback process 400 can return to repeat the decision 418 so that additional playback controls and/or playback status can be subsequently determined and suitably processed.

Figure 5:
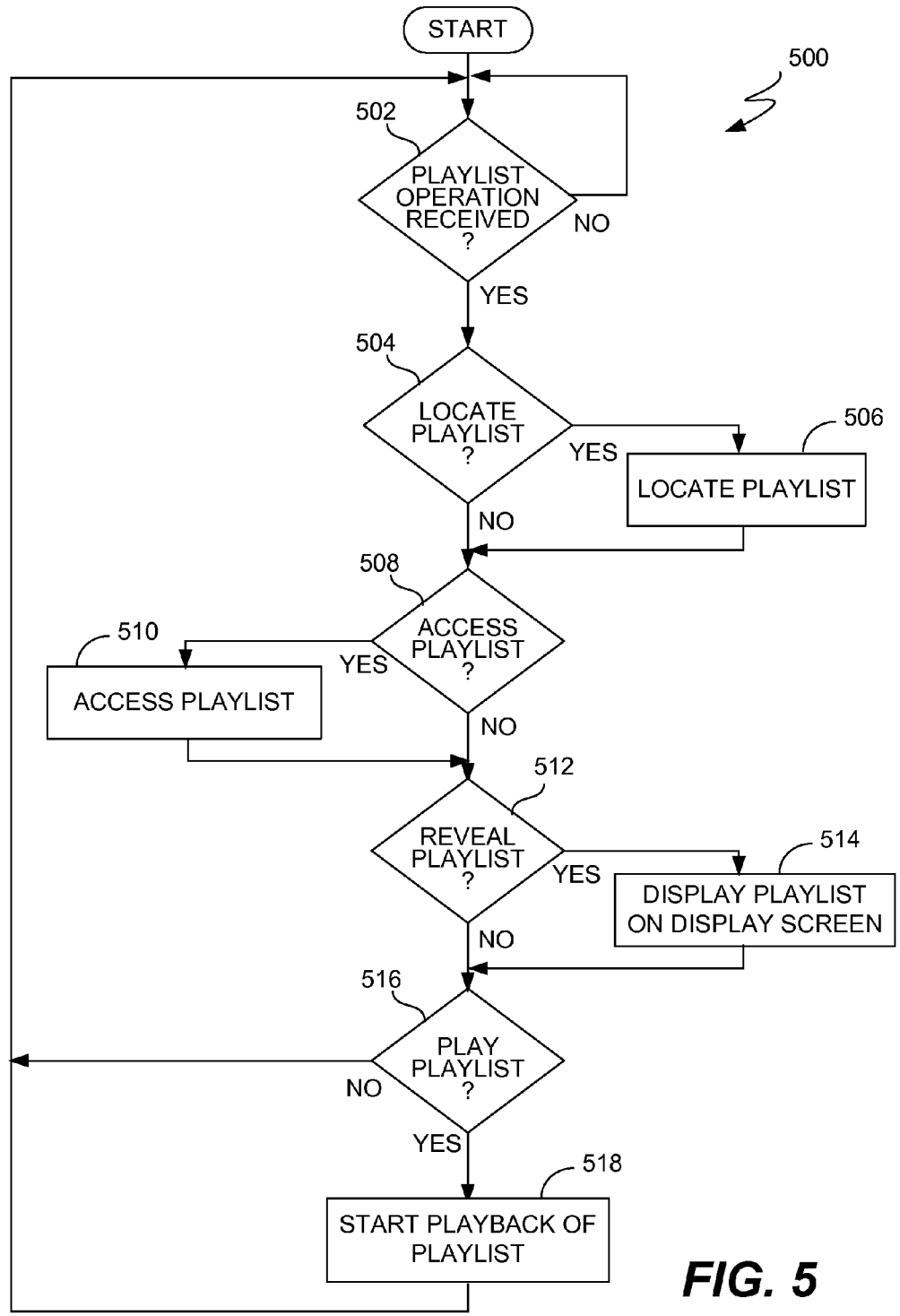
FIG. 5 is a flow diagram of a playlist process according to one embodiment.

FIG. 5 is a flow diagram of a playlist process 500 according to one embodiment. The playlist process 500 can represent one implementation of a presentation program that with the assistance of a programming interface can provide playlist-based operations for a media bundle. In one embodiment, the playlist process 500 is, for example, processing that can be performed by the presentation program 306 (e.g., bundle program code) together with the programming interface 312. Specifically, the MMA object 352 and the playlist object 358 of the programming interface 350 shown in FIG. 3B can be utilized in performing the playlist process 500.

The playlist process 500 can begin with a decision 502 that determines whether a playlist operation has been received. The playlist operation can be requested by program code or by a user input. In any case, when the decision 502 determines that a playlist operation has not been received, the playlist process 500 can await the receipt of a playlist operation. In other words, the playlist process 500 can be deemed invoked when a playlist operation has been received.

In any case, once the decision 502 determines that a playlist operation has been received, a decision 504 can determine whether at a playlist is to be located. For example, the playlist operation being received can specifically identify a playlist (e.g., identifier) or can more generally define or specify criteria (e.g., name, artist, etc.) for a playlist. When the decision 504 determines that the playlist is to be located, the playlist is located 506. The locating of the playlist can involve searching, finding, browsing, etc. for the playlist.

Following the block 506 or following the decision 504 when the playlist is not to be located, a decision 508 can determine whether the playlist is to be accessed. When the decision 508 determines that the playlist is to be accessed, the playlist can then be accessed 510. Here, the access 510 of the playlist can involve retrieval of the playlist from a local media library, a media bundle, or an external media data repository.

Following the block 510 or following the decision 508 when the playlist is not to be accessed, a decision 512 determines whether the playlist should be revealed. When the decision 512 determines that the playlist should be revealed, the playlist can be displayed 514 on a display device associated with the computing device performing the playlist process 500.

Following the block 514 or following the decision 512 when the playlist is not to be revealed, a decision 516 determines whether the playlist is to be played. When the decision 516 determines that the playlist is to be played, playback of the playlist can be started 518. Following the block 518 or following the decision 516 when the playlist is not to be played, the playlist process 500 returns to repeat the decision 502 so that subsequent playlist operations can be received and similarly processed.

Figure 6A:
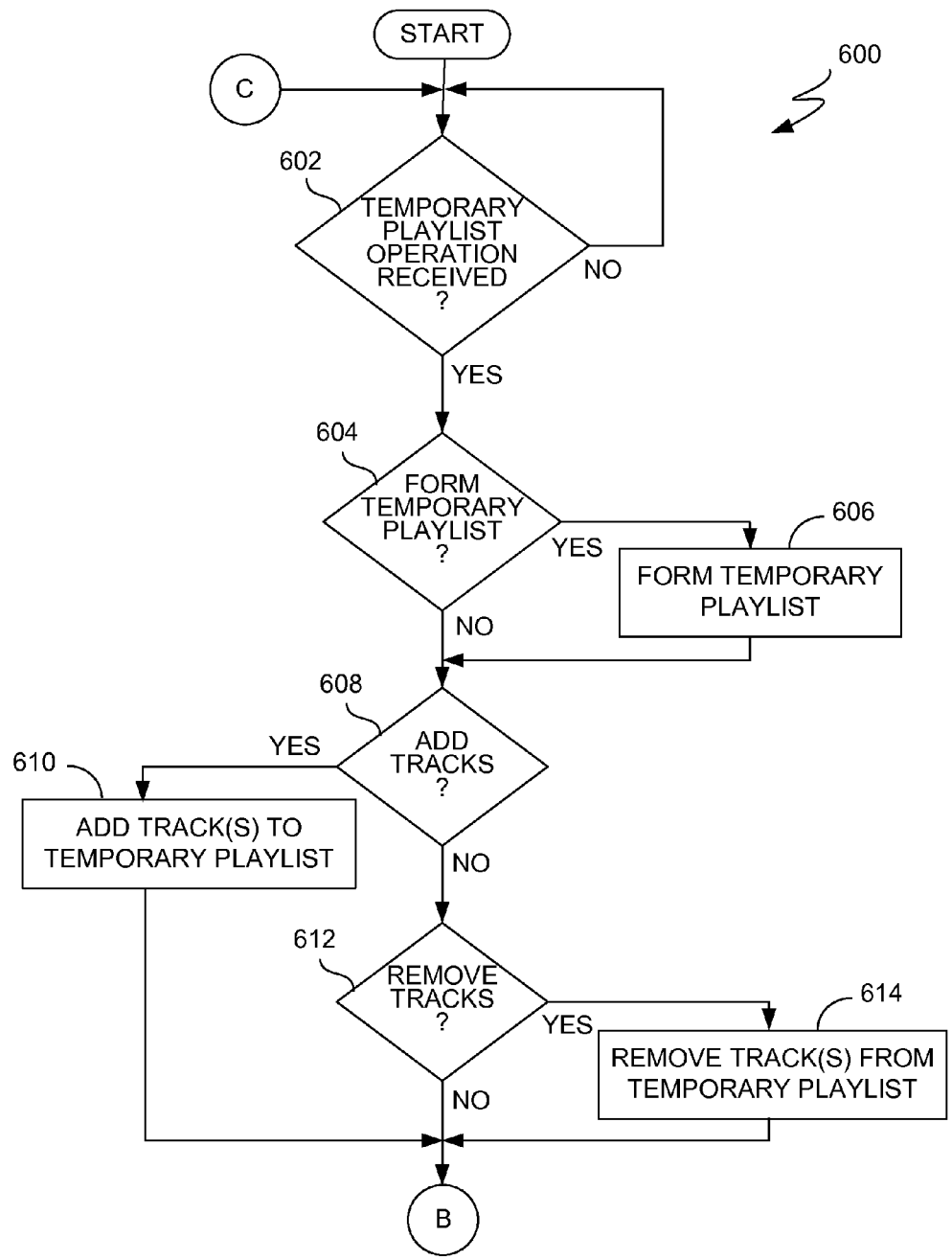
FIGS. 6A and 6B are flow diagrams of a temporary playlist process according to one embodiment.
Figure 6B:
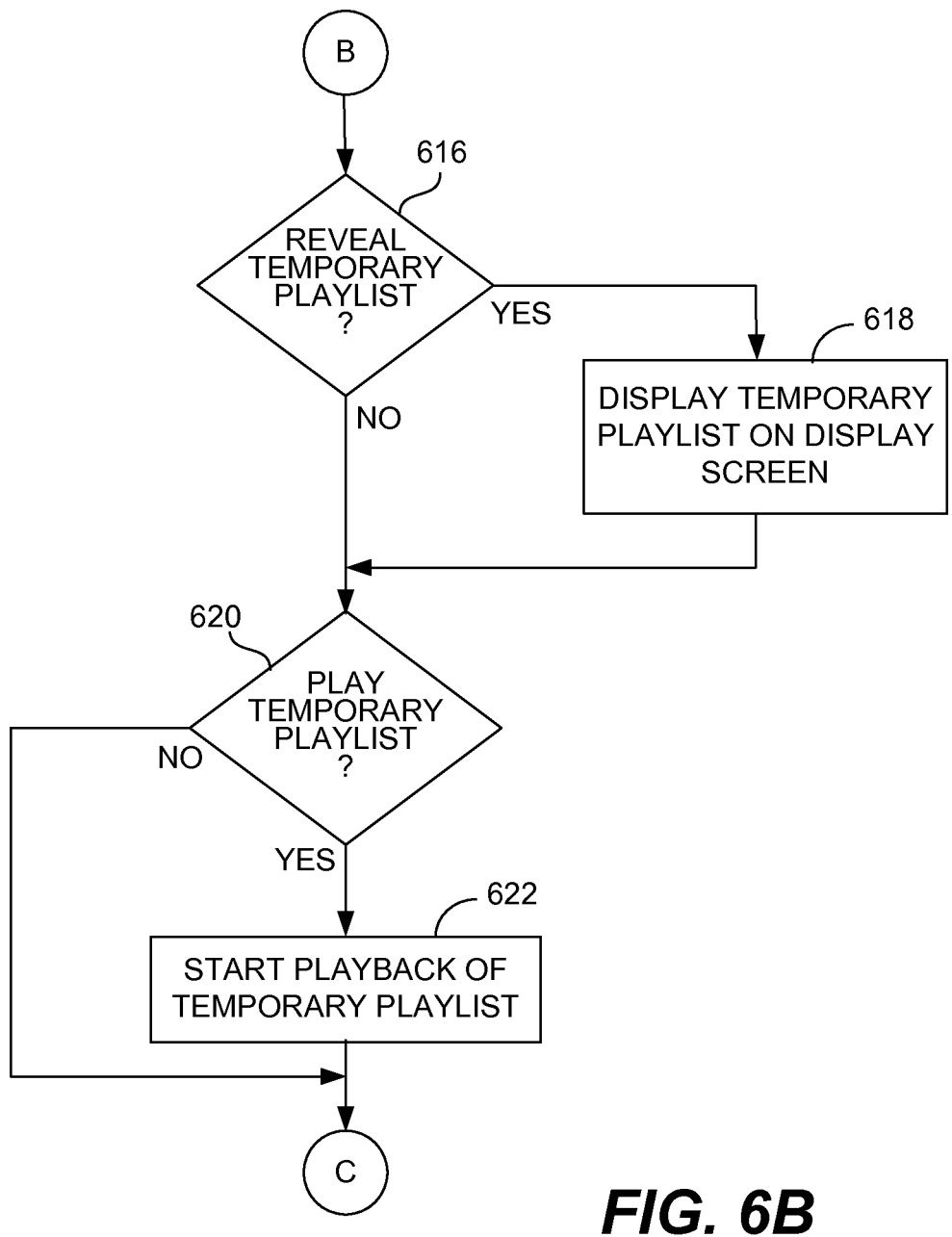

FIGS. 6A and 6B are flow diagrams of a temporary playlist process 600 according to one embodiment. The temporary playlist process 600 concerns processing that can be performed by a presentation program, such as the presentation program 306 illustrated in FIG. 3A. In one embodiment, the temporary playlist process 600 is, for example, processing that can be performed by the presentation program 306 together with the assistance of the programming interface 312. For example, the programming interface 350 can include a temporary playlist object 360 that provides properties and methods that are available by way of the programming interface 350. The temporary playlist process 600 can make use of properties and methods within the temporary playlist object 360 as well as the MMA object 352.

The temporary playlist process 600 can begin with a decision 602 that determines whether a temporary playlist operation has been received. When the decision 602 determines that a temporary playlist operation has not been received, the temporary playlist process 600 can await the receipt of a temporary playlist operation. Once the decision 602 determines that a temporary playlist operation has been received, a decision 604 can determine whether a temporary playlist is to be formed. When the decision 604 determines that a temporary playlist is to be formed, a temporary playlist can be formed 606.

Following the block 606 or following the decision 600 when a temporary playlist is not to be formed, a decision 608 can determine whether one or more tracks are to be added to the temporary playlist. When the decision 608 determines that one or more tracks are to be added to the temporary playlist, one or more tracks can be added 610 to the temporary playlist. On the other hand, when the decision 608 determines that one or more tracks are not to be added to the temporary playlist, a decision 612 can determine whether one or more tracks are to be removed from the playlist. When the decision 612 determines that one more tracks are to be removed from the temporary playlist, one or more tracks can be removed 614 from the temporary playlist.

Following the blocks 610 and 614 and also following the decision 612 when one or more tracks are not to be removed from the temporary playlist, the temporary playlist process 600 can proceed to a decision 616 that determines whether the temporary playlist is to be revealed. When the decision 616 determines that the temporary playlist is to be revealed, the temporary playlist can be displayed 618 on a display screen associated with the computing device performing the temporary playlist process 600.

Following the block 618 or following the decision 616 when the temporary playlist is not to be revealed, a decision 620 can determine whether the temporary playlist is to be played. When the decision 620 determines that the temporary playlist is to be played, playback of the temporary playlist can be started 622. When the decision 620 determines that the temporary playlist is not to be played, the block 622 can be bypassed. Following the block 622 or its being bypassed, the temporary playlist process 600 can return to repeat the decision 602 so that additional temporary playlist operations can be received and similarly processed.

Figure 7A:
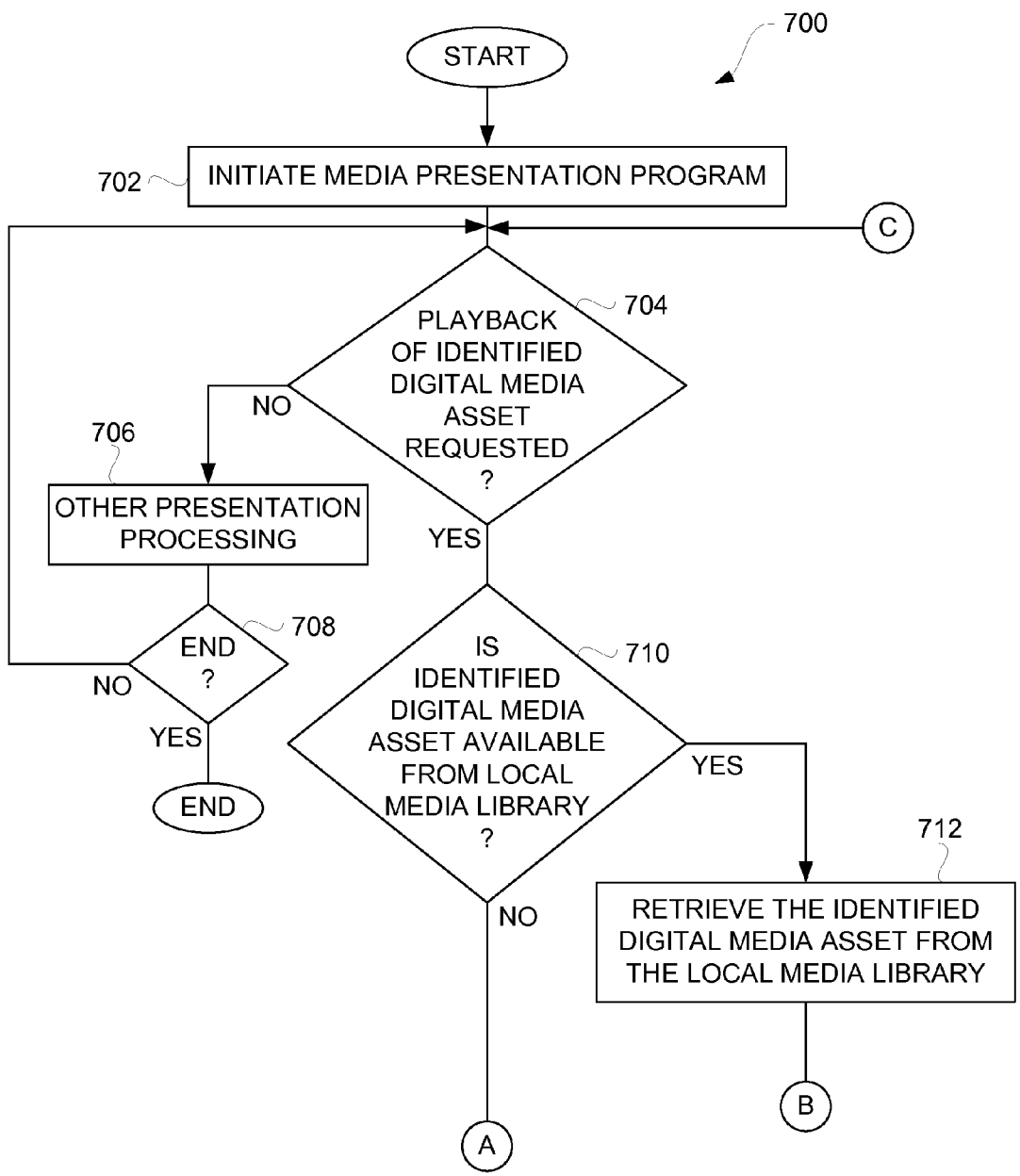
FIGS. 7A and 7B are flow diagrams of a media presentation process according to one embodiment.
Figure 7B:
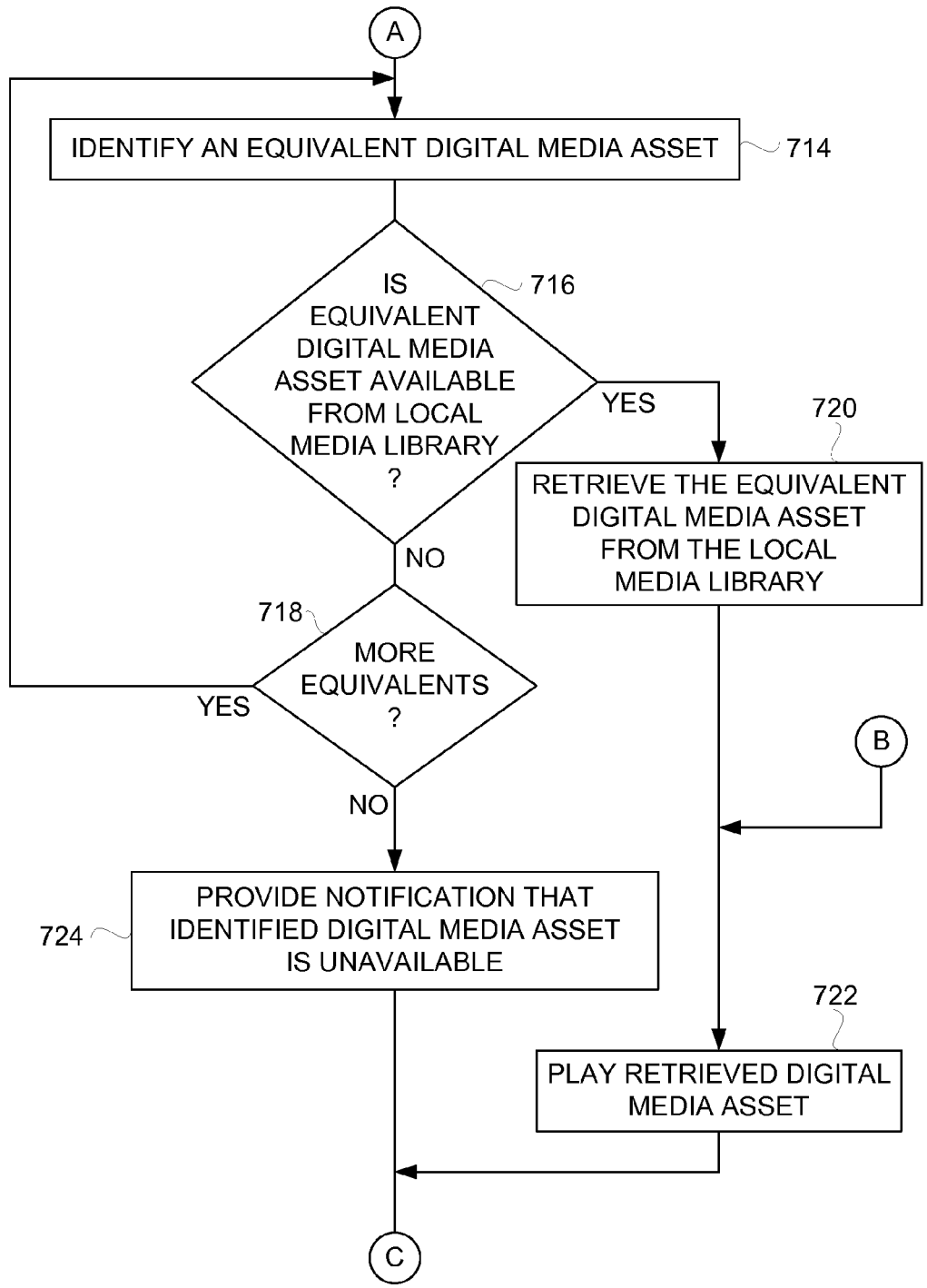

FIGS. 7A and 7B are flow diagrams of a media presentation process 700 according to one embodiment. The media presentation process 700 can pertain to processing performed by a client device, such as the client device 110 illustrated in FIG. 1.

The media presentation process 700 can initiate 702 a media presentation program. The media presentation program can be one bundle component of a media bundle. The media presentation program is a computer program that can control the presentation of media at the client device with respect to one or more bundle components within the media bundle.

Next, a decision 704 determines whether playback of an identified digital media asset has been requested. In executing or operating the media presentation program, there can be programming that seeks to access digital media assets. For example, programming code within the media presentation program can request that an identified digital media asset be played at the client device. Although the programming language can vary widely, in one implementation, the programming code is JavaScript.

When the decision 704 determines that playback of an identified digital media asset has not been requested, other presentation processing 706 can optionally be performed. For example, the other presentation processing 706 could cause text or images to be displayed on a display device associated with the client device. More generally, as an example, the other presentation processing 706 can cause one or more bundle media components to be presented at the client device. Following the optional block 706, a decision 708 can determine whether the media presentation process 700 should end. When the decision 708 determines that the media presentation process 700 should end, then the media presentation process 700 can end. Alternatively, when the decision 708 determines that the media presentation process 700 should not end, the media presentation process 700 returns to repeat the decision 704 and subsequent blocks so that the media presentation program can continue to effectively invoke media presentation processing.

On the other hand, when the decision 704 determines that playback of an identified digital media asset has been requested, the media presentation process 700 determines whether the identified digital media asset is available from a local media library at the client device. When the decision 710 determines that the identified digital media asset is available from the local media library, the identified digital media asset is retrieved 712 from the local media library. In alternative embodiments, the identified media assets might be retrieved from a media library not at the client device but nevertheless accessible to the client device (e.g., via a wireless network, a local area network, etc.).

Alternatively, when the decision 710 determines that the identified digital media asset is not available from the local media library, an equivalent digital media asset can be identified 714, if possible. Next, a decision 716 determines whether equivalent digital media asset is available from the local media library. When the decision 716 determines that an equivalent digital media asset is not available from the local media library, a decision 718 can determine whether there are more equivalents to be considered. When the decision 718 determines that there are more equivalent digital media assets to be considered, the media presentation process 700 can return to repeat the block 714 so that another equivalent digital media asset can be similarly processed.

On the other hand, when the decision 716 determines that the equivalent digital media asset is available from the local media library, the equivalent digital media asset can be retrieved 720 from the local media library. After the equivalent digital media asset has been retrieved 720, the retrieved digital media asset can be played 722. Also, following the block 712, the media presentation process 600 can proceed to the block 722 in the identified digital media asset was available from the local media library. Hence, in this situation, the identified digital media asset is available from the local media libraries so there is no need to determine and retrieve an equivalent digital media asset.

Alternatively, when the decision 718 determines that there are no more equivalent than digital media assets to be considered, a notification can be provided 724 that the identified digital media asset is unavailable. Following the blocks 722 and 724, the media presentation process 700 can return to repeat the decision 704 so that the media presentation program can continue to operate to provide presentation processing.

Figure 8:
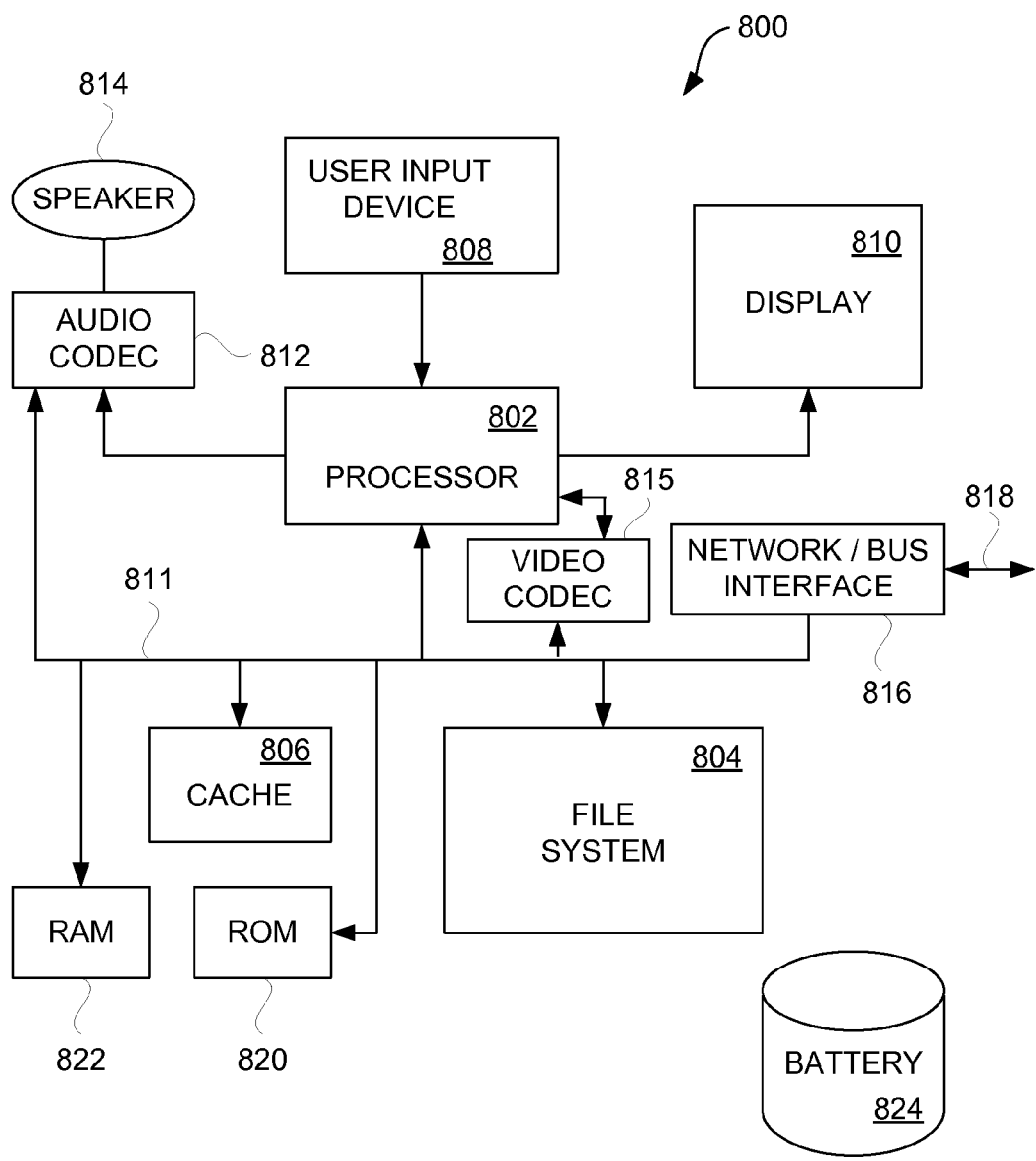
FIG. 8 is a block diagram of an exemplary computing device suitable for use with the invention.

The computing device can, for example, be an electronic device. FIG. 8 is a block diagram of an exemplary computing device 800 suitable for use with the invention. The computing device 800 illustrates circuitry of a representative portable electronic device.

The computing device 800 includes a processor 802 that pertains to a microprocessor or controller for controlling the overall operation of the computing device 800. The computing device 800 stores data pertaining to electronic files in a file system 804 and a cache 806. The file system 804 is, typically, semiconductor memory (e.g., Flash memory) and/or one or more storage disks. The file system 804 typically provides high capacity storage capability for the computing device 800. However, since the access time to the file system 804 can be relatively slow, the computing device 800 can also include the cache 806. The cache 806 is, for example, Random-Access Memory (RAM) provided by semiconductor memory. The relative access time to the cache 806 is typically shorter than for the file system 804. However, the cache 806 does not have the large storage capacity of the file system 804. Further, the file system 804, when active, consumes more power than does the cache 806. The power consumption is often a concern when the computing device 800 is a portable computing device that is powered by a battery 824. The computing device 800 also includes a Read-Only Memory (ROM) 820 and a RAM 822. The ROM 820 can store programs, utilities or processes to be executed in a non-volatile manner. The RAM 822 provides volatile data storage, such as for the cache 806.

The computing device 800 also includes a user input device 808 that allows a user of the computing device 800 to interact with the computing device 800. For example, the user input device 808 can take a variety of forms, such as a button, keypad, dial, touch-sensitive surface, etc. Still further, the computing device 800 includes a display 810 (screen display) that can be controlled by the processor 802 to display information to the user. A data bus 811 can facilitate data transfer between at least the file system 804, the cache 806, the processor 802, an audio coder/decoder (CODEC) 812 and/or a video CODEC 815.

In one embodiment, the computing device 800 serves to store a plurality of digital media assets, namely, media items (e.g., songs, videos, podcasts, etc.) in the file system 804. When a user desires to have the computing device play a particular media item, using the user input device 808, a user can select one of the available media items. The processor 802, upon receiving a selection of a particular media item, supplies the media data to one or more appropriate output devices. If the particular media item is encrypted, the particular media item is first decrypted. As an example, for audio output, the processor 802 can supply the media data (e.g., audio file) for the particular media item to the audio CODEC 812. The audio CODEC 812 can then produce analog output signals for a speaker 814. The speaker 814 can be a speaker internal to the computing device 800 or external to the computing device 800. For example, headphones or earphones that connect to the computing device 800 would be considered an external speaker. As another example, for video output, the processor 802 can supply the media data (e.g., video file) for the particular media item to the video CODEC 815. The video CODEC 815 can then produce output signals for the display 810 and/or the speaker 814.

The computing device 800 also includes a network/bus interface 816 that couples to a data link 818. The data link 818 allows the computing device 800 to couple to another device (e.g., another computing device, server computer, a host computer, or an accessory device). The data link 818 can be provided over a wired connection or a wireless connection. In the case of a wireless connection, the network/bus interface 816 can include a wireless transceiver. The data link 818 can, in some cases, also provide power to the computing device 800 (e.g., to charge the battery 824).

For additional details, including details on submission, distribution and installation of media bundles, see U.S. patent application Ser. No. 12/555,750, filed Sep. 8, 2009, and entitled "DIGITAL MEDIA BUNDLES FOR MEDIA PRESENTATION PLAYBACK", which is herein incorporated by reference. For still more additional details, including details on conversion data for identification of digital media assets, see U.S. patent application Ser. No. 12/555,643, filed Sep. 8, 2009, and entitled "DISTRIBUTION AND USAGE OF MEDIA BUNDLES", which is herein incorporated by reference.

The various aspects, features, embodiments or implementations of the invention described above can be used alone or in various combinations.

Embodiments of the invention can, for example, be implemented by software, hardware, or a combination of hardware and software. Embodiments of the invention can also be embodied as computer readable code on a computer readable medium. The computer readable medium is any data storage device that can store data which can thereafter be read by a computer system. Examples of the computer readable medium generally include read-only memory and random-access memory. More specific examples of computer readable medium are tangible and include Flash memory, EEPROM memory, memory card, CD-ROM, DVD, hard drive, magnetic tape, and optical data storage device. The computer readable medium can also be distributed over network-coupled computer systems so that the computer readable code is stored and executed in a distributed fashion.

Numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

In the foregoing description, reference to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A computing system comprising:
   a processor for operating at least a media management program;
   a data storage device for storing at least a media library having a first plurality of digital media content and at least one digital media bundle retrieved from an online media distribution site, the media library being for use by the media management program, the digital media bundle including a plurality of bundle components, at least one of the bundle components including bundle program code and a second plurality of digital media content; and
   a programming interface configured to facilitate access to programming methods and programming objects associated with the media management program,
   wherein the processor is configured to:
      execute the bundle program code and in doing so produce a media presentation at the computing system;
      determine if the media presentation is to include the first plurality of digital media content retrieved from the media library stored in the data storage device through use of the programming interface;
      determine if the media presentation is to include the second plurality of digital media content retrieved from the digital media bundle stored in the data storage device;
      determine if equivalent digital media content can be retrieved from the media library when digital media content specified by the digital media bundle is not stored in the data storage device; and
      execute playback commands based on playback status information provided by a plurality of programming objects provided by the media management program, wherein the plurality of programming objects comprises at least one of a media management object for external control of playback, a track object for retrieving properties and methods of digital media content, a playlist object, and a temporary playlist object.

2. A computing system as recited in claim 1, wherein the digital media bundle is a portable digital media bundle that has been provided separate and apart from the media management program.

3. A computing system as recited in claim 1, wherein the media presentation further uses media content or media data retrieved from a remote data repository through use of the programming interface.

4. A computing system as recited in claim 1, wherein the media presentation further uses media data retrieved from the media library through use of the programming interface.

5. A computing system as recited in claim 4, wherein the media bundle invokes at least a first programming method of the programming methods of the programming interface to locate and retrieve particular media content stored in the media library.

6. A computing system as recited in claim 5, wherein the bundle program code identifies the particular media content by a vendor identifier and wherein the digital media bundle includes conversion data to convert the vendor identifier to a distributor identifier before the particular media content is retrieved from the media library.

7. A computing system as recited in claim 1, wherein, although the application interface can access the media library, the access to the application interface is read only.

8. A computing system as recited in claim 1,
   wherein notifications are provided by the media management program of state changes, and
   wherein the bundle program code receives the notifications.

9. A method for providing a media presentation at a computing device, the method comprising:
   identifying a media bundle to be presented which is retrieved from an online media distribution site, the media bundle including media bundle program code and media content stored at the computing device;
   determining whether to retrieve the media content from a media library or to retrieve the media content from the media bundle;
   providing a media management application on the computing device that is associated with the media library to provide media-based operations;
   providing a programming interface for the media management application, wherein the media bundle program code uses the programming interface to access the media library via the media management application; and
   performing the media bundle program code to:
      access a media library at the computing device to retrieve media content if it is determined to retrieve media content from the media library;
      access the media bundle if it is determined to retrieve media content from the media bundle;
      access equivalent digital media content from the media library if media content cannot be retrieved from the media library or the media bundle;
      provide a media presentation at the computing device using at least the retrieved media content; and
      execute playback commands based on playback status information provided by a plurality of programming objects provided by the media management program, wherein the plurality of programming objects comprises at least one of a media management object for external control of playback, a track object for retrieving properties and methods of digital media content, a playlist object, and a temporary playlist object.

10. A method as recited in claim 9, wherein the method further comprises:
   providing a media management application on the computing device that is associated with the media library to provide media-based operations, and
   wherein the media bundle is a portable media bundle that has been provided to the computing device separate and apart from the media management application.

11. A method as recited in claim 9, wherein the method further comprises:
   providing a media management application on the computing device that is associated with the media library to provide media-based operations, and
   wherein the performing the media bundle program code operates in conjunction with the media management application to provide the media presentation at the computing device using at least the retrieved media content.

12. A method as recited in claim 9, wherein the media bundle program code invokes at least a programming method of the programming methods of the programming interface to locate and retrieve particular media content stored in the media library.

13. A method as recited in claim 9, wherein if the media bundle program code identifies a particular media content by a vendor identifier, and wherein the digital media bundle includes conversion data to convert the vendor identifier to a distributor identifier before the particular media content is retrieved from the media library.

14. A method as recited in claim 9, wherein the media bundle program can monitor media bundle status or playback status associated with the media management application.

15. A method as recited in claim 9, wherein the media management object facilitates access to methods and additional objects.

16. A method as recited in claim 9,
wherein the media management object has a plurality of properties and a plurality of methods,
wherein the properties of the media management object are chosen from the group including: accepted language, current chapter, current player state, current playing track, current time, muted, platform, version, and volume, and
wherein the methods of the media management object are chosen from the group including: back track, close booklet, create temporary playlist, fast forward, find playlist by name, find playlist by vendor identifier, find playlist by distributor identifier, find tracks by vendor identifier, find tracks by distributor identifier, find tracks by text fields, go to library, next chapter, next track, pause, play media content not within media library, previous chapter, previous track, resume, rewind, set mute, set volume, and stop.

17. A method as recited in claim 9,
wherein the track object has a plurality of properties and a plurality of methods,
wherein the properties of the track object are chosen from the group including: album, album artist, album rating, album rating kind, artist, artwork URL, bit rate, bookmark, bits per minute, category, chapters, comment, compilation, composer, date added, disc count, disc number, duration, episode identifier, episode number, equalizer preset, excluded from shuffle, genre, grouping, enabled, gapless, unplayed, valid, identifier, last played date, long description, lyrics, modification date, name, played count, rating, rating kind, release date, remember bookmark, sample rate, season number, short description, show, size, skipped count, skipped date, sort album, sort album artist, sort artist, sort composer, sort name, sort show, start time offset, stop time offset, store identifier, track count, track number, video kind, volume adjustment, vendor identifier, and year, and
wherein the methods of the track object are chosen from the group including: play and reveal.

18. A method as recited in claim 9,
wherein the track object has at least a play method for causing a track associated with the track object to be played.

19. A method as recited in claim 18, wherein the play method can start or end at a particular chapter of the track to be played.

20. A method as recited in claim 18, wherein the play method can start or end at a particular time offset of the track to be played.

21. A method as recited in claim 9,
wherein the playlist object has a plurality of properties and a plurality of methods,
wherein the properties of the playlist object are chosen from the group including: duration, set to shuffle, shared, smart, valid, visible, name, parent, identifier, repeat mode, size, and special kind, and
wherein the methods of the playlist object are chosen from the group including: play and reveal.

22. A method as recited in claim 9,
wherein the playlist object has at least a play method for causing a playlist associated with the playlist object to be played.

23. A method as recited in claim 9,
wherein the temporary playlist object has a plurality of properties and a plurality of methods,
wherein the properties of the playlist object are chosen from the group including: duration, set to shuffle, shared, smart, tracks, valid, visible, name, parent, identifier, repeat mode, size, and special kind, and
wherein the methods of the playlist object are chosen from the group including: add tracks, remove tracks, clear, add URL, play and reveal.

24. A method as recited in claim 9,
wherein the temporary playlist is not resident in the media library,
wherein the temporary playlist object has at least a play method for causing a temporary playlist associated with the temporary playlist object to be played, and
wherein the temporary playlist object has at least a remove track method to remove a track from the temporary playlist, and an add track method to add a track to the temporary playlist.

25. A non-transitory computer readable medium including at least executable computer program code stored thereon for providing a media presentation at a computing device, the computer readable medium comprising:
computer program code for identifying a media bundle to be presented which is retrieved from an online media distribution site, the media bundle including media bundle program code and media content;
computer program code for a media management application supporting media-based operations with respect to the media library, wherein the media bundle is a portable electronic container that has been provided to the computing device separate and apart from the media management application; and
computer program code for performing the media bundle program code to:
access the media library at the computing device to retrieve media content if it is determined to retrieve media content from the media library;
access the media bundle stored at the computing device if it is determined to retrieve media content from the media bundle;
access equivalent digital media content from the media library if media content cannot be retrieved from the media library or the media bundle; and
provide a media presentation at the computing device using at least the retrieved media content; and
execute playback commands based on playback status information provided by a plurality of programming objects provided by the media management program, wherein the plurality of programming objects comprises at least one of a media management object for external control of playback, a track object for retrieving properties and methods of digital media content, a playlist object, and a temporary playlist object.

* * * * *